US007132228B2

(12) United States Patent
Brick et al.

(10) Patent No.: US 7,132,228 B2
(45) Date of Patent: Nov. 7, 2006

(54) DEVELOPER DISPERSIONS FOR THERMALLY DEVELOPABLE MATERIALS

(75) Inventors: Mary C. Brick, Webster, NY (US); William D. Ramsden, Afton, MN (US); Doreen C. Lynch, Afton, MN (US)

(73) Assignee: Eastman Kodak Company, Rochester, NY (US)

( * ) Notice: Subject to any disclaimer, the term of this patent is extended or adjusted under 35 U.S.C. 154(b) by 106 days.

(21) Appl. No.: 10/935,645

(22) Filed: Sep. 7, 2004

(65) Prior Publication Data

US 2006/0051714 A1   Mar. 9, 2006

(51) Int. Cl.
*G03C 1/00* (2006.01)
*G03C 5/18* (2006.01)
*G03C 5/26* (2006.01)
*G03C 5/16* (2006.01)

(52) U.S. Cl. .............. 430/619; 430/617; 430/618; 430/620; 430/449; 430/348

(58) Field of Classification Search ........ 430/617–620, 430/449, 348
See application file for complete search history.

(56) References Cited

U.S. PATENT DOCUMENTS

| | | | |
|---|---|---|---|
| 3,827,889 A | 8/1974 | Ohkubo et al. | |
| 3,832,186 A | 8/1974 | Masuda et al. | |
| 3,881,938 A | 5/1975 | Masuda et al. | |
| 4,451,561 A | 5/1984 | Hirabayashi et al. | |
| 4,543,309 A | 9/1985 | Hirabayashi et al. | |
| 4,814,192 A | 3/1989 | Sapers et al. | |
| 5,750,323 A | 5/1998 | Scaringe et al. | |
| 6,132,948 A | 10/2000 | Hatakeyama | |
| 6,309,814 B1 | 10/2001 | Ito | |
| 6,576,410 B1 | 6/2003 | Zou et al. | |
| 2003/0180424 A1 | 9/2003 | Friedman et al. | |
| 2003/0224303 A1 | 12/2003 | Toda | |
| 2005/0164136 A1* | 7/2005 | Ramsden et al. | 430/477 |

FOREIGN PATENT DOCUMENTS

GB   1480704   7/1977

OTHER PUBLICATIONS

JP Abstract 60-133442.
U.S. Appl. No. 10/744,542, filed Dec. 22, 2003, titled *Stable Developer Dispersions For Color Photothermographic Systems,* by D.H. Levy et al.

\* cited by examiner

*Primary Examiner*—Geraldine Letscher
(74) *Attorney, Agent, or Firm*—J. Lanny Tucker; Louis M. Leichter

(57) ABSTRACT

Solid particle dispersions of certain ascorbic acid esters are prepared in the presence of at least 0.5 and less than 50 weight % of a particle growth modifier based on the weight of the ascorbic acid ester. The particle growth modifier is an alkyl carboxylic acid having from 8 to 22 carbon atoms, an alkyl ester of glycerol wherein the alkyl moiety has from 8 to 22 carbon atoms, or a stereoisomer of the ascorbic acid ester. The resulting aqueous solid particle dispersion can be used in various thermally developable materials including thermographic and photothermographic materials.

41 Claims, No Drawings

DEVELOPER DISPERSIONS FOR THERMALLY DEVELOPABLE MATERIALS

FIELD OF THE INVENTION

This invention relates to aqueous solid particle dispersions of reducing agents (developers) and a method for their preparation. It also relates to thermally developable materials, both thermographic and photothermographic materials, containing such solid particle dispersions.

BACKGROUND OF THE INVENTION

Silver-containing thermographic and photothermographic imaging materials (that is, thermally developable imaging materials) that are imaged and/or developed using heat and without liquid processing have been known in the art for many years.

Silver-containing thermographic imaging materials are non-photosensitive materials that are used in a recording process wherein images are generated by the use of thermal energy. These materials generally comprise a support having disposed thereon (a) a relatively or completely non-photosensitive source of reducible silver ions, (b) a reducing composition (usually including a developer) for the reducible silver ions, and (c) a suitable hydrophilic or hydrophobic binder.

In a typical thermographic construction, the image-forming layers are based on silver salts of long chain fatty acids. Typically, the preferred non-photosensitive reducible silver source is a silver salt of a long chain aliphatic carboxylic acid having from 10 to 30 carbon atoms. The silver salt of behenic acid or mixtures of acids of similar molecular weight are generally used. At elevated temperatures, the silver of the silver carboxylate is reduced by a reducing agent for silver ion such as methyl gallate, hydroquinone, substituted-hydroquinones, hindered phenols, catechols, pyrogallol, ascorbic acid, and ascorbic acid derivatives, whereby an image of elemental silver is formed. Some thermographic constructions are imaged by contacting them with the thermal head of a thermographic recording apparatus such as a thermal printer or thermal facsimile. In such constructions, an anti-stick layer is coated on top of the imaging layer to prevent sticking of the thermographic construction to the thermal head of the apparatus utilized. The resulting thermographic construction is then heated to an elevated temperature, typically in the range of from about 60 to about 225° C., resulting in the formation of an image.

Silver-containing photothermographic imaging materials (that is, thermally developable photosensitive imaging materials) are imaged with actinic radiation and then developed using heat and without liquid processing. Such materials are used in a recording process wherein an image is formed by imagewise exposure of the photothermographic material to specific electro-magnetic radiation (for example, X-radiation, or ultraviolet, visible, or infrared radiation) and developed by the use of thermal energy. These materials, also known as "dry silver" materials, generally comprise a support having coated thereon: (a) a photocatalyst (that is, a photosensitive compound such as silver halide) that upon such exposure provides a latent image in exposed grains that are capable of acting as a catalyst for the subsequent formation of a silver image in a development step, (b) a relatively or completely non-photosensitive source of reducible silver ions, (c) a reducing composition (usually including a developer) for the reducible silver ions, and (d) a hydrophilic or hydrophobic binder. The latent image is then developed by application of thermal energy.

In photothermographic materials, exposure of the photographic silver halide to light produces small clusters containing silver atoms $(Ag^0)_n$. The imagewise distribution of these clusters, known in the art as a latent image, is generally not visible by ordinary means. Thus, the photosensitive material must be further developed to produce a visible image. This is accomplished by the reduction of silver ions that are in catalytic proximity to silver halide grains bearing the silver-containing clusters of the latent image. This produces a black-and-white image. The non-photosensitive silver source is catalytically reduced to form the visible black-and-white negative image while much of the silver halide, generally, remains as silver halide and is not reduced.

In photothermographic materials, the reducing agent for the reducible silver ions, often referred to as a "developer," may be any compound that, in the presence of the latent image, can reduce silver ion to metallic silver and is preferably of relatively low activity until it is heated to a temperature sufficient to cause the reaction. A wide variety of classes of compounds have been disclosed in the literature that function as developers for photothermographic materials. At elevated temperatures, the reducible silver ions are reduced by the reducing agent. In photothermographic materials, upon heating, this reaction occurs preferentially in the regions surrounding the latent image. This reaction produces a negative image of metallic silver having a color that ranges from yellow to deep black depending upon the presence of toning agents and other components in the imaging layer(s).

Problem to be Solved

Substantially water-insoluble chemical compounds are often useful in various imaging materials including thermally developable imaging materials. Frequently they must be incorporated into aqueous-based imaging layers in the form of solid particle dispersions or emulsions. There are many known methods for making such dispersions or emulsions, including milling or other high shear techniques, and precipitation techniques with appropriate dispersing aids.

Unfortunately, unwanted particle growth is an unintended effect from the preparation of solid particles dispersions and many innovations have been made in the art in an attempt to solve this problem.

For example, U.S. Pat. No. 5,750,323 (Scaringe et al) discloses a method of preparing stable dispersions of filter dyes for photographic materials and thermal transfer dyes for thermal transfer materials by milling the dye with a growth modifier that is similar in structure, but has a higher molecular weight than the dye in order to prevent unwanted particle growth.

Photothermographic materials have been described in the art to include various non-photosensitive sources of reducible silver ions including silver salts of benzotriazole and silver salts of its derivatives [see for example, U.S. Pat. No. 6,576,410 (Zou et al)].

The reduction of the silver ions in silver benzotriazole to silver metal in photothermographic materials generally requires a relatively strong reducing agent. A typical developer choice is ascorbic acid that has been shown to provide useful photospeed, adequate Dmax, and low Dmin. Derivatives (such as esters) of ascorbic acid have also been described as reducing agents for silver ions in organic silver salts. For example, ascorbic acid palmitate and dipalmitate are described for this purpose in U.S. Pat. No. 4,543,309 (Hirabayashi et al.) and U.S. Pat. No. 4,451,561 (Hirabayashi et al.) and ascorbic acid stearate, myristate, and laurate are described for this purpose in U.S. Pat. No. 3,832,186 (Masuda et al.) and U.S. Pat. No. 3,881,938 (Masuda et al.) and FR 1,542,505 (Okubo et al.). Similar ascorbic acid derivatives are described in Japanese Kokai 06-0133442, 49-013224, and 05-1027923, and GB 1,480,704. Generally, these ascorbic acid derivatives are added as a solution in organic solvent and the photothermographic media are coated from an organic solvent or as a dispersion in methanol.

However, incorporation of dispersions of ascorbic acid derivatives as reducing agents into aqueous-based imaging formulations has not been easy, and attempts to make solid particle dispersions have often encountered unwanted particle growth after milling. This is because a particle growth modifier that stabilizes one type of compound in one type of system is not predictive of its stabilizing ability toward another type of compound in a different system.

There is continuing need find appropriate particle growth modifiers that will stabilize solid particle dispersions of ascorbic acid derivatives such as ascorbic acid esters.

SUMMARY OF THE INVENTION

We have found a method of preparing solid particle dispersions of ascorbic acid esters and particle growth modifiers that do not exhibit unwanted particle growth after preparation.

This invention provides a method for making an aqueous particulate dispersion comprising:
 A) mixing an ascorbic acid ester with a particle growth modifier that is present in an amount of at least 0.5 and less than 50 weight % based on the weight of the ascorbic acid ester, and
 B) dispersing the ascorbic acid ester and the particle growth modifier together in an aqueous medium to form an aqueous dispersion,
wherein the particle growth modifier is an alkyl carboxylic acid having from 8 to 22 carbon atoms, an alkyl ester of glycerol wherein the alkyl moiety has from 8 to 22 carbon atoms, or a stereoisomer of the ascorbic acid ester.

This invention also provides a stable aqueous solid particle dispersion comprising solid particles of an ascorbic acid ester that is present in an amount of from about 1 to about 50 weight %, and a particle growth modifier that is present in an amount of at least 0.5 and less than 50 weight % based on the weight of the ascorbic acid ester, the particle growth modifier is an alkyl carboxylic acid having from 8 to 22 carbon atoms, an, alkyl ester of glycerol wherein the alkyl moiety has from 8 to 22 carbon atoms, or a stereoisomer of the ascorbic acid ester.

Moreover, a thermally developable imaging material of this invention comprises a support and has thereon one or more imaging layers comprising a hydrophilic binder or water-dispersible latex polymer and in reactive association:
 a) a source of reducible silver ions comprising an organic silver salt, and
 b) a reducing agent for the reducible silver ions,
wherein the reducing agent is present in the form of stable aqueous solid particle dispersion comprising solid particles of an ascorbic acid ester.

A black-and-white photothermographic material comprises a support and has thereon one or more aqueous-based imaging layers comprising a hydrophilic binder or water-dispersible latex polymer and in reactive association:
 a) a source of reducible silver ions comprising a silver salt of an N-heterocyclic compound,
 b) a reducing agent for the reducible silver ions, and
 c) a photosensitive silver halide,
wherein the reducing agent is present in the form of stable aqueous solid particle dispersion comprising solid particles of an ascorbic acid ester, the solid particle dispersion further comprising a particle growth modifier that is present in an amount of at least 0.5 and less than 50 weight % based on the weight of the ascorbic acid ester, the particle growth modifier is an alkyl carboxylic acid having from 8 to 22 carbon atoms, a mono-alkyl ester of glycerol wherein the alkyl moiety has from 8 to 22 carbon atoms, or a stereoisomer of the ascorbic acid ester.

In preferred embodiments, a black-and-white photothermographic material comprises a support having on a frontside thereof,
 a) one or more frontside imaging layers comprising a hydrophilic polymer or water-dispersible latex polymer as the binder, and in reactive association, a photosensitive silver halide, a non-photosensitive source of reducible silver ions that includes a silver salt of a compound containing an imino group, and a reducing agent for the non-photosensitive source reducible silver ions, and
the material comprising on the backside of the support, one or more backside imaging layers comprising a hydrophilic polymer or a water-dispersible latex polymer as the binder, and in reactive association, a photosensitive silver halide, a non-photosensitive source of reducible silver ions that includes a silver salt of a compound containing an imino group, and a reducing agent for the non-photosensitive source reducible silver ions, and
wherein the one or more imaging layers on both sides of the support have the same or different composition, and
 b) an outermost protective layer over the one or more imaging layers on both sides of the support, each protective layer having the same or different composition,
wherein the reducing agent on both sides of the support is the same or different and is present in the form of stable aqueous solid particle dispersion comprising solid particles of an ascorbic acid ester, the solid particle dispersion further comprising a particle growth modifier that is present in an amount of at least 0.5 and less than 50 weight % based on the weight of the ascorbic acid ester, the particle growth modifier is an alkyl carboxylic acid having from 8 to 22 carbon atoms, a mono-alkyl ester of glycerol wherein the alkyl moiety has from 8 to 22 carbon atoms, or a stereoisomer of the ascorbic acid ester.

In more preferred embodiments, a black-and-white photothermographic material comprises a support having on a frontside thereof,
 a) one or more frontside imaging layers comprising gelatin or a derivative thereof, a cellulosic material, or a poly(vinyl alcohol) as the binder, and in reactive association, a photosensitive silver bromide or iodobromide in the form of tabular grains that is spectrally sensitized to radiation having a wavelength of from about 380 to about 420 nm, a non-photosensitive silver salt of a benzotriazole, and a reducing agent for the non-photosensitive source of reducible silver ions, and
the material comprising on the backside of the support, one or more backside imaging layers comprising a gelatin or a derivative thereof, a cellulosic material, or a poly(vinyl alcohol) as the binder, and in reactive association, a photosensitive silver bromide or iodobromide in the form of tabular grains that is spectrally sensitized to radiation having a wavelength of from about 380 to about 420 nm, a non-photosensitive silver salt of a benzotriazole, and a reducing agent for the non-photosensitive source of reducible silver ions, and wherein the one or more imaging layers on both sides of the support have essentially the same composition, and b) an outermost protective layer over the one or more imaging layers on both sides of the support, each protective layer having essentially the same composition, wherein the reducing agent on both sides of the support is the same and is present in the form of stable aqueous solid particle dispersion comprising solid particles of L-ascorbic acid 6-O-palmitate, the solid particle dispersion further comprising a particle growth modifier that is present in an amount of at least 1 and less than 5 weight % based on the weight of the ascorbic acid ester, the particle growth modifier is D-iso-ascorbic acid 6-O-palmitate, palmitic acid, monopalmitin, or monostearin.

An imaging assembly of this invention comprises a photothermographic material of this invention that is arranged in association with one or more phosphor intensifying screens.

This invention further provides a method of forming a visible image in thermographic materials that comprises:

(A) thermal imaging of the thermographic material.

This invention also provides a method for forming a visible image in photothermographic materials comprising:

(A') imagewise exposing any of the photothermographic materials of the present invention to radiation to form a latent image, and (B) simultaneously or sequentially, heating the exposed photothermographic material to develop the latent image into a visible image.

These imaging forming methods are particularly useful for providing a medical diagnosis of a human or animal subject.

The present invention provides a way to stabilize esters of ascorbic acid compounds (or "ascorbic acid esters") in solid particle dispersions by using a particular particle growth modifier, namely an alkyl carboxylic acid having from 8 to 22 carbon atoms, an alkyl ester of glycerol wherein the alkyl moiety has from 8 to 22 carbon atoms, or a stereoisomer of the ascorbic acid ester. Thus, we have observed minimal unwanted particle growth when the ascorbic acid esters particles are "protected" by the noted particle growth modifiers during storage of the dispersions and/or thermally developable materials into which they are incorporated.

DETAILED DESCRIPTION OF THE INVENTION

The thermally developable materials can be used in black-and-white or color photothermography and in electronically generated black-and-white or color hardcopy recording. They can be used in microfilm applications, in radiographic imaging (for example medical imaging), X-ray radiography, and in industrial radiography. Furthermore, the absorbance of these materials between 350 and 450 nm is desirably low (less than 0.5), to permit their use in the graphic arts area (for example, imagesetting and phototypesetting), in the manufacture of printing plates, in contact printing, in duplicating ("duping"), and in proofing.

While both thermographic and photothermographic materials are contemplated within the invention, the following details will be focused primarily on the photothermographic materials. However, a skilled artisan would know how to adapt this teaching to prepare and use thermographic materials as well.

The thermally developable materials are particularly useful for medical imaging of human or animal subjects in response to visible or X-radiation for use in medical diagnosis. Such applications include, but are not limited to, thoracic imaging, mammography, dental imaging, orthopedic imaging, general medical radiography, therapeutic radiography, veterinary radiography, and auto-radiography. Increased sensitivity to X-radiation can be imparted through the use of phosphors. When used with X-radiation, the photothermographic materials may be used in combination with one or more phosphor intensifying screens, with phosphors incorporated within the photothermographic emulsion, or with a combination thereof.

The photothermographic materials can be made sensitive to radiation of any suitable wavelength. Thus, in some embodiments, the materials are sensitive at ultraviolet, visible, near infrared, or infrared wavelengths of the electromagnetic spectrum. In these embodiments, the materials are preferably sensitive to radiation greater than 300 nm (such as sensitivity to, from about 300 nm to about 450 nm and preferably from about 360 to about 420 nm). Increased sensitivity to a particular region of the spectrum is imparted through the use of various sensitizing dyes.

The photothermographic materials are also useful for non-medical uses of visible or X-radiation (such as X-ray lithography and industrial radiography). In these and other imaging applications, it is particularly desirable that the photothermographic materials be "double-sided."

In some embodiments of the thermally developable materials, the components needed for imaging can be in one or more imaging or emulsion layers on one side ("frontside") of the support. The layer(s) that contain the photosensitive photocatalyst (such as a photosensitive silver halide) for photothermographic materials or the non-photosensitive source of reducible silver ions, or both, are referred to herein as the emulsion layer(s). In photothermographic materials, the photocatalyst and non-photosensitive source of reducible silver ions are in catalytic proximity and preferably are in the same emulsion layer. Various non-imaging layers can also be disposed on the "backside" (non-emulsion or non-imaging side) of the materials, including, conductive layers, antihalation layer(s), protective layers, antistatic layers, and transport enabling layers.

Various non-imaging layers can also be disposed on the "frontside" or imaging or emulsion side of the support, including primer layers, interlayers, opacifying layers, antistatic layers, antihalation layers, acutance layers, auxiliary layers, and other layers readily apparent to one skilled in the art.

For preferred embodiments, it is desired that the thermally developable materials are "double-sided" or "duplitized" and have the same or different emulsion coatings (or imaging layers) on both sides of the support. In such constructions each side can also include one or more primer layers, interlayers, antistatic layers, acutance layers, antihalation layers, auxiliary layers, conductive layers, anti-crossover layers, and other layers readily apparent to one skilled in the art.

When the photothermographic materials are heat-developed as described below in a substantially water-free condition after, or simultaneously with, imagewise exposure, a silver image (preferably a black-and-white silver image) is obtained.

DEFINITIONS

As used herein:

In the descriptions of the thermally developable imaging materials, "a" or "an" component refers to "at least one" of that component (for example, the ascorbic acid esters).

Unless otherwise indicated, when the terms "thermally developable imaging materials," "thermographic materials," or "photothermographic materials" are used herein, it is in reference to materials of the present invention.

Heating in a substantially water-free condition as used herein, means heating at a temperature of from about 50° C. to about 250° C. with little more than ambient water vapor present. The term "substantially water-free condition" means that the reaction system is approximately in equilibrium with water in the air and water for inducing or promoting the reaction is not particularly or positively supplied from the exterior to the material. Such a condition is described in T. H. James, *The Theory of the Photographic Process,* Fourth Edition, Eastman Kodak Company, Rochester, N.Y., 1977, p. 374.

"Photothermographic material(s)" means a construction comprising at least one photothermographic emulsion layer or a photothermographic set of emulsion layers (wherein the photosensitive silver halide and the source of reducible silver ions are in one layer and the other essential components or desirable additives are distributed, as desired, in the same layer or in an adjacent coated layer. These materials also include multilayer constructions in which one or more imaging components are in different layers, but are in "reactive association." For example, one layer can include the non-photosensitive source of reducible silver ions and another layer can include the reducing agent and/or photosensitive silver halide.

When used in photothermography, the term, "imagewise exposing" or "imagewise exposure" means that the material is imaged using any exposure means that provides a latent image using electromagnetic radiation. This includes, for example, analog exposure where an image is formed by projection onto the photosensitive material as well as digital exposure where the image is formed one pixel at a time such as by modulation of scanning laser radiation.

"Thermographic material(s)" can be similarly constructed but are intentionally non-photosensitive (thus no photosensitive silver halide is intentionally added or generated).

When used in thermography, the term "imagewise exposing" or "imagewise exposure" means that the material is imaged using any suitable thermal imaging source such as a thermal print head.

"Catalytic proximity" or "reactive association" means that the materials are in the same layer or in adjacent layers so that they readily come into contact with each other during thermal imaging and development.

"Emulsion layer," "thermally developable imaging layer," or "photothermographic (or "thermographic") emulsion layer," means a layer of a photothermographic (or thermographic) material that contains the photosensitive silver halide (not present in thermographic materials) and/or non-photosensitive source of reducible silver ions. It can also mean a layer of the material that contains, in addition to the photosensitive silver halide and/or non-photosensitive source of reducible ions, additional imaging components and/or desirable additives such as the reducing agent(s). These layers are usually on what is known as the "frontside" of the support but they can be on both sides of the support.

In addition, "frontside" also generally means the side of a thermally developable material that is first exposed to imaging radiation, and "backside" generally refers to the opposite side of the thermally developable material.

"Photocatalyst" means a photosensitive compound such as silver halide that, upon exposure to radiation, provides a compound that is capable of acting as a catalyst for the subsequent development of the thermally developable material.

Many of the materials used herein are provided as a solution. The term "active ingredient" means the amount or the percentage of the desired material contained in a sample. All amounts listed herein are the amount of active ingredient added.

"Ultraviolet region of the spectrum" refers to that region of the spectrum less than or equal to 410 nm, and preferably from about 100 nm to about 410 nm, although parts of these ranges may be visible to the naked human eye. More preferably, the ultraviolet region of the spectrum is the region of from about 190 nm to about 405 nm.

"Visible region of the spectrum" refers to that region of the spectrum of from about 400 nm to about 700 nm.

"Short wavelength visible region of the spectrum" refers to that region of the spectrum of from about 400 nm to about 450 nm.

"Red region of the spectrum" refers to that region of the spectrum of from about 600 nm to about 700 nm.

"Infrared region of the spectrum" refers to that region of the spectrum of from about 700 nm to about 1400 nm.

"Non-photosensitive" means not intentionally light sensitive.

"Transparent" means capable of transmitting visible light or imaging radiation without appreciable scattering or absorption.

The sensitometric terms "photospeed," "speed," or "photographic speed" (also known as sensitivity), absorbance, and contrast have conventional definitions known in the imaging arts. The sensitometric term "absorbance" is another term for optical density (OD).

In photothermographic materials, the term Dmin (lower case) is considered herein as image density achieved when the photothermographic material is thermally developed without prior exposure to radiation. The term Dmax (lower case) is the maximum image density achieved in the imaged area of a particular sample after imaging and development. In thermographic materials, $D_{min}$ is considered herein as the image density in the areas with the minimum application of heat by the thermal printhead. In thermographic materials, the term Dmax is the maximum image density achieved when the thermographic material is thermally imaged with a given amount of thermal energy.

In both photothermographic and thermographic materials, the term Dmin (upper case) is the density of the unimaged material. In photothermographic materials, the term Dmax (upper case) is the maximum image density achievable when the photothermographic material is exposed and then thermally developed. In thermographic materials, the term Dmax is the maximum image density achievable when the thermographic material is thermally developed. Dmax is also known as "Saturation Density."

Two compounds are stereoisomers of one another if the bonding arrangement in one is identical to that in the other except in the way the atoms are oriented in space. This includes compounds that are nonsuperimposable mirror images of one another and compounds that are not mirror images of one another. This definition of stereoisomer is found in T. H. Lowry and K. S. Richardson, *Mechanism and Theory in Organic Chemistry,* 1976, Harper and Row, p. 57.

"Symmetric" thermally developable materials refers to thermographic or photothermographic materials that have imaging layers on both sides of the support (that is "duplitized") that have essentially the same chemical composition and sensitometric properties. Such materials also have essentially the same non-imaging layers on both sides of the support.

As used herein, the phrase "organic silver coordinating ligand" refers to an organic molecule capable of forming a bond with a silver atom. Although the compounds so formed are technically silver coordination compounds they are also often referred to as silver salts.

In the compounds described herein, no particular double bond geometry (for example, cis or trans) is intended by the structures drawn unless otherwise specified. Similarly, in compounds having alternating single and double bonds and localized charges their structures are drawn as a formalism. In reality, both electron and charge delocalization exists throughout the conjugated chain.

As is well understood in this art, for the chemical compounds herein described, substitution is not only tolerated, but is often advisable and various substituents are anticipated on the compounds used in the present invention unless otherwise stated. Thus, when a compound is referred to as "having the structure" of, or as "a derivative" of, a given formula, any substitution that does not alter the bond structure of the formula or the shown atoms within that structure is included within the formula, unless such substitution is specifically excluded by language.

As a means of simplifying the discussion and recitation of certain substituent groups, the term "group" refers to chemical species that may be substituted as well as those that are not so substituted. Thus, the term "alkyl group" is intended to include not only pure hydrocarbon alkyl chains, such as methyl, ethyl, n-propyl, t-butyl, cyclohexyl, iso-octyl, and octadecyl, but also alkyl chains bearing substituents known in the art, such as hydroxyl, alkoxy, vinyl, phenyl, halogen atoms (F, Cl, Br, and I), cyano, nitro, amino, and carboxy. For example, alkyl group includes ether and thioether groups (for example $CH_3$—$CH_2$—$CH_2$—O—$CH_2$— and $CH_3$—$CH_2$—$CH_2$—S—$CH_2$—), hydroxyalkyl (such as 1,2-dihydroxyethyl), haloalkyl, nitroalkyl, alkylcarboxy, carboxyalkyl, carboxamido, sulfoalkyl, and other groups readily apparent to one skilled in the art. Substituents that adversely react with other active ingredients, such as very strongly electrophilic or oxidizing substituents, would, of course, be excluded by the ordinarily skilled artisan as not being inert or harmless.

*Research Disclosure* is a publication of Kenneth Mason Publications Ltd., Dudley House, 12 North Street, Emsworth, Hampshire PO10 7DQ England (also available from Emsworth Design Inc., 147 West 24th Street, New York, N.Y. 10011).

Other aspects, advantages, and benefits of the present invention are apparent from the detailed description, examples, and claims provided in this application.

The Photocatalyst

The photothermographic materials include one or more photocatalysts in the photothermographic emulsion layer(s). Useful photocatalysts are typically photosensitive silver halides such as silver bromide, silver iodide, silver chloride, silver bromoiodide, silver chlorobromoiodide, silver chlorobromide, and others readily apparent to one skilled in the art. Mixtures of silver halides can also be used in any suitable proportion. Silver bromide and silver bromoiodide are more preferred silver halides, with the latter silver halide having up to 10 mol % silver iodide based on total silver halide.

In some embodiments, higher amounts of iodide may be present in the photosensitive silver halide grains up to the saturation limit of iodide as described in U.S. patent application Publication 2004/0053173 (Maskasky et al.).

The silver halide grains may have any crystalline habit or morphology including, but not limited to, cubic, octahedral, tetrahedral, orthorhombic, rhombic, dodecahedral, other polyhedral, tabular, laminar, twinned, or platelet morphologies and may have epitaxial growth of crystals thereon. If desired, a mixture of grains with different morphologies can be employed. Silver halide grains having cubic and tabular morphology (or both) are preferred. More preferably, the silver halide grains are predominantly (at least 50% based on total silver halide) present as tabular grains.

The silver halide grains may have a uniform ratio of halide throughout. They may have a graded halide content, with a continuously varying ratio of, for example, silver bromide and silver iodide, or they may be of the core-shell type, having a discrete core of one or more silver halides, and a discrete shell of one of more different silver halides. Core-shell silver halide grains useful in photothermographic materials and methods of preparing these materials are described for example in U.S. Pat. No. 5,382,504 (Shor et al.), incorporated herein by reference. Iridium and/or copper doped core-shell and non-core-shell grains are described in U.S. Pat. No. 5,434,043 (Zou et al.) and U.S. Pat. No. 5,939,249 (Zou), both incorporated herein by reference.

In some instances, it may be helpful to prepare the photosensitive silver halide grains in the presence of a hydroxytetraazaindene or an N-heterocyclic compound comprising at least one mercapto group as described in U.S. Pat. No. 6,413,710 (Shor et al.), that is incorporated herein by reference.

The photosensitive silver halide can be added to (or formed within) the emulsion layer(s) in any fashion as long as it is placed in catalytic proximity to the non-photosensitive source of reducible silver ions.

It is preferred that the silver halide grains be preformed and prepared by an ex-situ process, and then be added to and physically mixed with the non-photosensitive source of reducible silver ions.

It is also possible to form the source of reducible silver ions in the presence of ex-situ-prepared silver halide. In this process, the source of reducible silver ions, such as a silver salt of an imino compound, is formed in the presence of the preformed silver halide grains. Co-precipitation of the reducible source of silver ions in the presence of silver halide provides a more intimate mixture of the two materials [see, for example U.S. Pat. No. 3,839,049 (Simons)] to provide a "preformed emulsion."

It is also effective to use an in-situ process in which a halide- or halogen-containing compound is added to an organic silver salt to partially convert the silver of the organic silver salt to silver halide. Inorganic halides (such as zinc bromide, calcium bromide, lithium bromide, or zinc iodide) or an organic halogen-containing compound (such as N-bromosuccinimide or pyridinium hydrobromide perbromide) can be used. The details of such in-situ generation of silver halide are well known and described for example in U.S. Pat. No. 3,457,075 (Morgan et al.).

Additional methods of preparing these silver halide and organic silver salts and manners of blending them are described in *Research Disclosure,* June 1978, item 17029, U.S. Pat. No. 3,700,458 (Lindholm) and U.S. Pat. No.

4,076,539 (Ikenoue et al.), Japanese Kokai 49-013224, (Fuji), 50-017216 (Fuji), and 51-042529 (Fuji).

In general, the non-tabular silver halide grains used in this invention can vary in average diameter of up to several micrometers (µm) and they usually have an average particle size of from about 0.01 to about 1.5 µm (preferably from about 0.03 to about 1.0 µm, and more preferably from about 0.05 to about 0.8 µm).

The average size of the photosensitive silver halide grains is expressed by the average diameter if the grains are spherical, and by the average of the diameters of equivalent circles for the projected images if the grains are cubic, tabular, or other non-spherical shapes. Representative grain sizing methods are described by in "Particle Size Analysis," ASTM Symposium on Light Microscopy, R. P. Loveland, 1955, pp. 94–122, and in C. E. K. Mees and T. H. James, *The Theory of the Photographic Process,* Third Edition, Macmillan, New York, 1966, Chapter 2. Particle size measurements may be expressed in terms of the projected areas of grains or approximations of their diameters. These will provide reasonably accurate results if the grains of interest are substantially uniform in shape.

In most preferred embodiments of this invention, the silver halide grains are provided predominantly (based on at least 50 mol % silver) as tabular silver halide grains that are considered "ultrathin" and have an average thickness of at least 0.02 µm and up to and including 0.10 µm (preferably, an average thickness of at least 0.03 µm and more preferably of at least 0.04 µm, and up to and including 0.08 µm and more preferably up to and including 0.07 µm).

In addition, these ultrathin tabular grains have an equivalent circular diameter (ECD) of at least 0.5 µm (preferably at least 0.75 µm, and more preferably at least 1 µm). The ECD can be up to and including 8 µm (preferably up to and including 6 µm, and more preferably up to and including 4 µm).

The aspect ratio of the useful tabular grains is at least 5:1 (preferably at least 10:1, and more preferably at least 15:1) and generally up to 50:1.

The grain size of ultrathin tabular grains may be determined by any of the methods commonly employed in the art for particle size measurement, such as those described above.

The ultrathin tabular silver halide grains can also be doped using one or more of the conventional metal dopants known for this purpose including those described in *Research Disclosure* item 38957, September, 1996 and U.S. Pat. No. 5,503,970 (Olm et al.), incorporated herein by reference. Preferred dopants include iridium (III or IV) and ruthenium (II or III) salts.

Mixtures of both in-situ and ex-situ silver halide grains may be used.

The one or more light-sensitive silver halides used in the photothermographic materials are preferably present in an amount of from about 0.005 to about 0.5 mole (more preferably from about 0.01 to about 0.25 mole, and most preferably from about 0.03 to about 0.15 mole) per mole of non-photosensitive source of reducible silver ions.

Chemical Sensitizers

The photosensitive silver halides used in photothermographic materials can be chemically sensitized using any useful compound that contains sulfur, tellurium, or selenium, or may comprise a compound containing gold, platinum, palladium, ruthenium, rhodium, iridium, or combinations thereof, a reducing agent such as a tin halide or a combination of any of these. The details of these materials are provided for example, in T. H. James, *The Theory of the Photographic Process,* Fourth Edition, Eastman Kodak Company, Rochester, N.Y., 1977, Chapter 5, pp. 149–169. Suitable conventional chemical sensitization procedures and compounds are also described in U.S. Pat. No. 1,623,499 (Sheppard et al.), U.S. Pat. No. 2,399,083 (Waller et al.), U.S. Pat. No. 3,297,447 (McVeigh), U.S. Pat. No. 3,297,446 (Dunn), U.S. Pat. No. 5,049,485 (Deaton), U.S. Pat. No. 5,252,455 (Deaton), U.S. Pat. No. 5,391,727 (Deaton), U.S. Pat. No. 5,912,111 (Lok et al.), U.S. Pat. No. 5,759,761 (Lushington et al.), U.S. Pat. No. 6,296,998 (Eikenberry et al), and U.S. Pat. No. 5,691,127 (Daubendiek et al.), and EP 0 915 371 A1 (Lok et al.), all incorporated herein by reference.

Certain substituted or and unsubstituted thioureas can be used as chemical sensitizers including those described in U.S. Pat. No. 6,296,998 (Eikenberry et al.), U.S. Pat. No. 6,322,961 (Lam et al.), U.S. Pat. No. 4,810,626 (Burgmaier et al.), and U.S. Pat. No. 6,368,779 (Lynch et al.), all of the which are incorporated herein by reference.

Still other useful chemical sensitizers include tellurium- and selenium-containing compounds that are described in U.S. Pat. No. 6,699,647 (Lynch et al.), U.S. Pat. No. 5,158,892 (Sasaki et al.), U.S. Pat. No. 5,238,807 (Sasaki et al.), U.S. Pat. No. 5,942,384 (Arai et al.), and U.S. Pat. No. 6,620,577 (Lynch et al.), all of which are incorporated herein by reference.

Noble metal sensitizers for use in the present invention include gold, platinum, palladium and iridium. Gold (+1 or +3) sensitization is particularly preferred, and described in U.S. Pat. No. 5,858,637 (Eshelman et al.) and U.S. Pat. No. 5,759,761 (Lushington et al.). Combinations of gold(III) compounds and either sulfur- or tellurium-containing compounds are useful as chemical sensitizers and are described in U.S. Pat. No. 6,423,481 (Simpson et al.). All of the above references are incorporated herein by reference.

In addition, sulfur-containing compounds can be decomposed on silver halide grains in an oxidizing environment. Examples of such sulfur-containing compounds include sulfur-containing spectral sensitizing dyes described in U.S. Pat. No. 5,891,615 (Winslow et al.) and diphenylphosphite sulfide compounds represented by the Structure (PS) described in U.S. Pat. No. 7,026,105 (Simpson et al.), both of which are incorporated herein by reference.

The chemical sensitizers can be used in making the silver halide emulsions in conventional amounts that generally depend upon the average size of the silver halide grains. Generally, the total amount is at least $10^{-10}$ mole per mole of total silver, and preferably from about $10^{-8}$ to about $10^{-2}$ mole per mole of total silver. The upper limit can vary depending upon the compound(s) used, the level of silver halide, and the average grain size and grain morphology.

Spectral Sensitizers

The photosensitive silver halides used in the photothermographic materials may be spectrally sensitized with one or more spectral sensitizing dyes that are known to enhance silver halide sensitivity to ultraviolet, visible, and/or infrared radiation. Non-limiting examples of spectral sensitizing dyes that can be employed include cyanine dyes, merocyanine dyes, complex cyanine dyes, complex merocyanine dyes, holopolar cyanine dyes, hemicyanine dyes, styryl dyes, and hemioxanol dyes. They may be added at any stage in chemical sensitization of the photothermographic emulsion, but are generally added after chemical sensitization is achieved. In preferred embodiments, the photosensitive silver halide is spectrally sensitized to a wavelength of from about 300 to about 450 nm, more preferably from about 360 to about 420 nm, and most preferably from about 380 to about 420 nm. A worker skilled in the art would know which spectral sensitizing dyes to use for a desired sensitivity.

Suitable spectral sensitizing dyes such as those described in U.S. Pat. No. 3,719,495 (Lea), U.S. Pat. No. 4,396,712 (Kinoshita et al.), U.S. Pat. No. 4,439,520 (Kofron et al.), U.S. Pat. No. 4,690,883 (Kubodera et al.), U.S. Pat. No. 4,840,882 (Iwagaki et al.), U.S. Pat. No. 5,064,753 (Kohno et al.), U.S. Pat. No. 5,281,515 (Delprato et al.), U.S. Pat. No. 5,393,654 (Burrows et al), U.S. Pat. No. 5,441,866 (Miller et al.), U.S. Pat. No. 5,508,162 (Dankosh), U.S. Pat. No. 5,510,236 (Dankosh), and U.S. Pat. No. 5,541,054 (Miller et al.), Japanese Kokai 2000-063690 (Tanaka et al.), 2000-112054 (Fukusaka et al.), 2000-273329 (Tanaka et al.), 2001-005145 (Arai), 2001-064527 (Oshiyama et al.), and 2001-154305 (Kita et al.), can be used in the practice of the invention. All of the publications noted above are incorporated herein by reference. Useful spectral sensitizing dyes are also described in *Research Disclosure,* item 308119, Section IV, December, 1989.

Teachings relating to specific combinations of spectral sensitizing dyes also provided in U.S. Pat. No. 4,581,329 (Sugimoto et al.), U.S. Pat. No. 4,582,786 (Ikeda et al.), U.S. Pat. No. 4,609,621 (Sugimoto et al.), U.S. Pat. No. 4,675,279 (Shuto et al.), U.S. Pat. No. 4,678,741 (Yamada et al.), U.S. Pat. No. 4,720,451 (Shuto et al.), U.S. Pat. No. 4,818,675 (Miyasaka et al.), U.S. Pat. No. 4,945,036 (Arai et al.), and U.S. Pat. No. 4,952,491 (Nishikawa et al.). All of the above publications and patents are incorporated herein by reference.

Also useful are spectral sensitizing dyes that decolorize by the action of light or heat as described in U.S. Pat. No. 4,524,128 (Edwards et al.), Japanese Kokai 2001-109101 (Adachi), 2001-154305 (Kita et al.), and 2001-183770 (Hanyu et al.).

Dyes may also be selected for the purpose of supersensitization to attain much higher sensitivity than the sum of sensitivities that can be achieved by using each dye alone.

An appropriate amount of spectral sensitizing dye added is generally about $10^{-10}$ to $10^{-1}$ mole, and preferably, about $10^{-7}$ to $10^{-2}$ mole per mole of silver halide.

Non-Photosensitive Source of Reducible Silver Ions

The non-photosensitive source of reducible silver ions used in the thermally developable materials can be any metal-organic compound that contains reducible silver(I) ions. Such compounds are generally organic silver salts of organic silver coordinating ligands that are comparatively stable to light and form a silver image when heated to 50° C. or higher in the presence of an exposed silver halide (for photothermographic materials) and a reducing agent.

Silver salts of nitrogen-containing heterocyclic compounds are preferred, and one or more silver salts of heterocyclic compounds containing an imino group are particularly preferred. Representative compounds of this type include, but are not limited to, silver salts of benzotriazole and substituted derivatives thereof (for example, silver methylbenzotriazole and silver 5-chlorobenzotriazole), silver salts of 1,2,4-triazoles or 1-H-tetrazoles such as phenylmercaptotetrazole as described in U.S. Pat. No. 4,220,709 (deMauriac), and silver salts of imidazole and imidazole derivatives as described in U.S. Pat. No. 4,260,677 (Winslow et al.). Particularly useful silver salts of this type are the silver salts of benzotriazole, substituted derivatives thereof, or mixtures of two or more of these salts. A silver salt of benzotriazole is most preferred in the photothermographic emulsions and materials.

Particularly useful nitrogen-containing organic silver salts and methods of preparing them are described in U.S. Pat. No. 6,977,139 (Zou et al.) that is incorporated herein by reference. Such silver salts (particularly the silver benzotriazoles) are rod-like in shape and have an average aspect ratio of at least 3:1 and a width index for particle diameter of 1.25 or less. Silver salt particle length is generally less than 1 μm.

Other silver salts can be used if present in "minor" amounts (less than 50 mol %) based on the total moles of organic silver salts.

Silver salts of heterocyclic compounds containing mercapto or thione groups and derivatives thereof can also be used. Such heterocyclic nuclei include, but are not limited to, triazoles, oxazoles, thiazoles, thiazolines, imidazoles, diazoles, pyridines, and triazines as described in U.S. Pat. No. 4,123,274 (Knight et al.) and U.S. Pat. No. 3,785,830 (Sullivan et al.). Examples of other useful silver salts of mercapto or thione substituted compounds that do not contain a heterocyclic nucleus include silver salts of thioglycolic acids, silver salts of dithiocarboxylic acids, and silver salts of thioamides.

Silver salts of organic acids including silver salts of long-chain aliphatic or aromatic carboxylic acids may also be included in minor amounts. The chains typically contain 10 to 30, and preferably 15 to 28, carbon atoms. Silver behenate is a preferred silver carboxylate, alone or mixed with other silver carboxylates.

Sources of reducible silver ions can also be core-shell silver salts as described in U.S. Pat. No. 6,355,408 (Whitcomb et al.), that is incorporated herein by reference wherein a core has one or more silver salts and a shell has one or more different silver salts.

Other useful sources of non-photosensitive reducible silver ions are the silver dimer compounds that comprise two different silver salts as described in U.S. Pat. No. 6,566,045 (Whitcomb), that is incorporated herein by reference.

Still other useful sources of non-photosensitive reducible silver ions in the practice of this invention are the silver core-shell compounds comprising a primary core comprising one or more photosensitive silver halides, or one or more non-photosensitive inorganic metal salts or non-silver containing organic salts, and a shell at least partially covering the primary core, wherein the shell comprises one or more non-photosensitive silver salts, each of which silver salts comprises a organic silver coordinating ligand. Such compounds are described in U.S. patent application Publication 2004/0023164 (Bokhonov et al.) that is incorporated herein by reference.

The one or more non-photosensitive sources of reducible silver ions are preferably present in an amount of about 5% by weight to about 70% by weight, and more preferably, about 10% to about 50% by weight, based on the total dry weight of the emulsion layers. Alternatively, the amount of the sources of reducible silver ions is generally present in an amount of from about 0.001 to about 0.2 mol/m$^2$ of the dry material (preferably from about 0.01 to about 0.05 mol/m$^2$).

The total amount of silver (from all silver sources) in the thermally developable imaging materials is generally at least 0.002 mol/m$^2$ and preferably from about 0.01 to about 0.05 mol/m$^2$.

Reducing Agents

The predominant reducing agents (or "developers") useful in this invention are ascorbic acid esters. The phrase "ascorbic acid esters" includes alkyl esters of L-ascorbic acid (vitamin C), D-ascorbic acid, D-iso-ascorbic acid (also commonly known as D-araboascorbic acid or erythorbic acid), and L-iso-ascorbic acid. Particularly useful ascorbic acid esters are those having 8 to 22 carbon atoms and more preferably, 12 to 18 carbon atoms in the ester group. Examples of such ascorbic acid esters are mono- or di-fatty acid esters such as the monolaurate, monomyristate, monopalmitate, monostearate, monobehenate, dilaurate, distearate, dipalmitate, dibehenate, and dimyristate derivatives of ascorbic acid as described in U.S. Pat. No. 3,832,186 (Masuda et al.) and U.S. Pat. No. 6,309,814 (Ito). A most preferred reducing agent of this type is L-ascorbic acid 6-O-palmitate.

Minor (less than 20 mol % of total moles of reducing agents) of conventional reducing agents (such as hindered phenols) can be used in combination with the ascorbic acid esters if desired, but it is preferred that the thermally developable materials contain one or more ascorbic acid esters as the exclusive reducing agents.

If desired, co-developers and contrast enhancing agents may be used in combination with the ascorbic acid esters described herein. Useful co-developer reducing agents include for example, those described in U.S. Pat. No. 6,387,605 (Lynch et al.) that is incorporated herein by reference.

Additional classes of reducing agents that may be used as co-developers are trityl hydrazides and formyl phenyl hydrazides as described in U.S. Pat. No. 5,496,695 (Simpson et al.), 2-substituted malondialdehyde compounds as described in U.S. Pat. No. 5,654,130 (Murray), and 4-substituted isoxazole compounds as described in U.S. Pat. No. 5,705,324 (Murray). Additional developers are described in U.S. Pat. No. 6,100,022 (Inoue et al.). All of the patents above are incorporated herein by reference.

Yet another class of co-developers includes substituted acrylonitrile compounds that are identified as HET-01 and HET-02 in U.S. Pat. No. 5,635,339 (Murray) and CN-01 through CN-13 in U.S. Pat. No. 5,545,515 (Murray et al.), both incorporated herein by reference.

Various contrast enhancing agents may be used in some photothermographic materials with specific co-developers. Examples of useful contrast enhancing agents include, but are not limited to, hydroxylamines (including hydroxylamine and alkyl- and aryl-substituted derivatives thereof), alkanolamines and ammonium phthalamate compounds as described in U.S. Pat. No. 5,545,505 (Simpson), hydroxamic acid compounds as described in U.S. Pat. No. 5,545,507 (Simpson et al.), N-acylhydrazine compounds as described in U.S. Pat. No. 5,558,983 (Simpson et al.), and hydrogen atom donor compounds as described in U.S. Pat. No. 5,637,449 (Harring et al.). All of the patents above are incorporated herein by reference.

The ascorbic acid ester (or mixture thereof) is generally present in the thermally developable materials in an amount of from about 0.3 to about 1.0 mol/mol of total silver, or in an amount of from about 0.002 to about 0.05 mol/m$^2$ (preferably from about 0.006 to about 0.03 mol/m$^2$).

The ascorbic acid esters used as reducing agents are provided in solid particulate form in stable aqueous particulate dispersions. These dispersions are made using a unique particle growth modifier that is present in an amount of at least 0.5 but less than 50 weight % (based on the total weight of ascorbic acid ester). Preferably, the amount of particle growth modifier is from about 1 to about 10 weight %, and more preferably from about 1 to about 5 weight % (based on total ascorbic acid ester weight). The ascorbic acid ester(s) is generally present in the dispersion in an amount of from about 1 to about 50 weight % (preferably from about 5 to about 30 weight %).

The particle growth modifier is either an alkyl ester of glycerol wherein the alkyl moiety has from 8 to 22 carbon atoms (preferably from 12 to 22 carbon atoms), an alkyl carboxylic acid having from 8 to 22 carbon atoms (preferably from 12 to 22 carbon atoms), or a stereoisomer of the ascorbic acid ester (as defined above). In preferred embodiments, the ascorbic acid ester is L-ascorbic acid 6-O-palmitate and the particle growth modifier is D-iso-ascorbic acid 6-O-palmitate, palmitic acid, monopalmitin, or monostearin. More preferably, the particle growth modifier is a mono-alkyl ester of glycerol wherein the alkyl moiety has from 12 to 18 carbon atoms. Most preferably, the particle growth modifier is palmitic acid, monopalmitin or monostearin.

The one or more ascorbic acid esters are mixed with one or more particle growth modifiers and dispersed in a suitable aqueous solvent. By aqueous is meant that at least 50 solvent volume % and preferably at least 70 solvent volume % is water.

In a preferred method, the dispersion is prepared using a suitable milling technique. Using this method, the ascorbic acid ester and particle growth modifier are mixed with optional water-soluble surfactants and/or polymers to form an aqueous slurry and loaded into a suitable mill. The mill can be, for example, a ball mill, media mill, attritor mill, jet mill, or vibratory mill that is charged with the appropriate milling media such as beads of silica, silicon nitride, sand, zirconium oxide, yttria-stabilized zirconium oxide, alumina, titanium, glass, or polystyrene. The bead sizes generally range from 0.25 to 3 mm in diameter but smaller media can be used if desired. As the ascorbic acid ester particles repeatedly collide with the milling media, they are reduced in size. Generally, milling is carried out for a suitable time to provide ascorbic ester particle size of less than 5 μm and preferably from about 0.01 to about 1 μm. This may require from 30 minutes to 30 days depending upon the milling technique, initial size of the particles, and desired final particle size.

The dispersion can also be prepared using a pH precipitation method. An aqueous solution of the ascorbic acid ester is prepared at relatively high pH. The particle growth modifier is also dissolved in this high pH solution. The pH is then lowered to cause precipitation. The aqueous solution can further contain appropriate surfactants and polymers known in the art for this purpose.

The dispersion can also be prepared by precipitation using a solvent shifting dispersion method. A solution of the ascorbic acid ester and the particle growth modifier in a water-miscible organic solvent is first prepared. The organic solution is then added in a controlled manner to an aqueous solution to cause precipitation of the ascorbic acid ester. Alternatively, the aqueous solution may be added to the organic solution in a controlled manner to cause precipitation of the ascorbic acid ester. The aqueous solution can further contain appropriate surfactants and polymers known in the art for this purpose.

The water-soluble surfactants and polymers, antifoamants, and other addenda that may be included in the various dispersions are well known in the art and described for example in U.S. Pat. No. 5,750,323 (Scaringe et al.) that is incorporated herein by reference for that disclosure only.

Other Addenda

The thermally developable materials can also include one or more compounds that are known in the art as "toners." Toners are compounds that when added to the imaging layer shift the color of the developed silver image from yellowish-orange to brown-black or blue-black, and/or act as development accelerators to speed up thermal development. "Toners" or derivatives thereof that improve the black-and-white image are highly desirable components of the thermally developable materials.

Thus, compounds that either act as toners or react with a reducing agent to provide toners can be present in an amount of about 0.01% by weight to about 10% (preferably from about 0.1% to about 10% by weight) based on the total dry weight of the layer in which they are included. The amount can also be defined as being within the range of from about $1\times10^{-5}$ to about 1.0 mol per mole of non-photosensitive source of reducible silver in the photothermographic material. The toner compounds may be incorporated in one or more of the thermally developable layers as well as in adjacent layers such as the outermost protective layer or underlying "carrier" layer. Toners can be located on both sides of the support if thermally developable layers are present on both sides of the support.

Compounds useful as toners are described in U.S. Pat. No. 3,074,809 (Owen), U.S. Pat. No. 3,080,254 (Grant, Jr.), U.S. Pat. No. 3,446,648 (Workman), U.S. Pat. No. 3,844,797 (Willems et al.), U.S. Pat. No. 3,847,612 (Winslow), U.S. Pat. No. 3,951,660 (Hagemann et al.), U.S. Pat. No. 4,082,901 (Laridon et al.), U.S. Pat. No. 4,123,282 (Winslow), U.S. Pat. No. 5,599,647 (Defieuw et al.), and U.S. Pat. No. 3,832,186 (Masuda et al.), and GB 1,439,478 (AGFA).

Particularly useful toners are mercaptotriazoles as described in U.S. Pat. No. 6,713,240 (Lynch et al.), the heterocyclic disulfide compounds described in U.S. Pat. No. 6,737,227 (Lynch et al.), the triazine-thione compounds described in U.S. Pat. No. 6,703,191 (Lynch et al.). All of the above are incorporated herein by reference.

Also useful as toners are phthalazine and phthalazine derivatives [such as those described in U.S. Pat. No. 6,146,822 (Asanuma et al.) incorporated herein by reference], phthalazinone, and phthalazinone derivatives as well as phthalazinium compounds [such as those described in U.S. Pat. No. 6,605,418 (Ramsden et al.), incorporated herein by reference].

The thermally developable materials can also contain other additives, where appropriate, such as shelf-life stabilizers, antifoggants, contrast enhancing agents, development accelerators, acutance dyes, post-processing stabilizers or stabilizer precursors, thermal solvents (also known as melt formers), humectants, and other image-modifying agents as would be readily apparent to one skilled in the art.

To further control the properties of photothermographic materials (for example, contrast, Dmin, speed, or fog), it may be preferable to add one or more heteroaromatic mercapto compounds or heteroaromatic disulfide compounds of the formulae Ar—S-M$^1$ and Ar—S—S—Ar, wherein M$^1$ represents a hydrogen atom or an alkali metal atom and Ar represents a heteroaromatic ring or fused heteroaromatic ring containing one or more of nitrogen, sulfur, oxygen, selenium, or tellurium atoms. Useful heteroaromatic mercapto compounds are described as supersensitizers in EP 0 559 228 B1 (Philip et al.).

The photothermographic materials can be further protected against the production of fog and can be stabilized against loss of sensitivity during storage. Suitable antifoggants and stabilizers that can be used alone or in combination include thiazolium salts as described in U.S. Pat. No. 2,131,038 (Brooker et al.) and U.S. Pat. No. 2,694,716 (Allen), azaindenes as described in U.S. Pat. No. 2,886,437 (Piper), triazaindolizines as described in U.S. Pat. No. 2,444,605 (Heimbach), urazoles as described in U.S. Pat. No. 3,287,135 (Anderson), sulfocatechols as described in U.S. Pat. No. 3,235,652 (Kennard), oximes as described in GB 623,448 (Carrol et al.), polyvalent metal salts as described in U.S. Pat. No. 2,839,405 (Jones), thiuronium salts as described in U.S. Pat. No. 3,220,839 (Herz), palladium, platinum, and gold salts as described in U.S. Pat. No. 2,566,263 (Trirelli) and U.S. Pat. No. 2,597,915 (Damshroder), compounds having —SO$_2$CBr$_3$ groups as described in U.S. Pat. No. 5,594,143 (Kirk et al.) and U.S. Pat. No. 5,374,514 (Kirk et al.), and 2-(tribromomethylsulfonyl) quinoline compounds as described in U.S. Pat. No. 5,460,938 (Kirk et al.).

Stabilizer precursor compounds capable of releasing stabilizers upon application of heat during development can also be used as described in U.S. Pat. No. 5,158,866 (Simpson et al.), U.S. Pat. No. 5,175,081 (Krepski et al.), U.S. Pat. No. 5,298,390 (Sakizadeh et al.), and U.S. Pat. No. 5,300,420 (Kenney et al.).

In addition, certain substituted-sulfonyl derivatives of benzotriazoles (for example alkylsulfonylbenzotriazoles and arylsulfonylbenzotriazoles) have been found to be useful for post-processing print stabilizing as described in U.S. Pat. No. 6,171,767 (Kong et al.).

Other useful antifoggants/stabilizers are described in U.S. Pat. No. 6,083,681 (Lynch et al.). Still other antifoggants are hydrobromic acid salts of heterocyclic compounds (such as pyridinium hydrobromide perbromide) as described in U.S. Pat. No. 5,028,523 (Skoug), benzoyl acid compounds as described in U.S. Pat. No. 4,784,939 (Pham), substituted propenenitrile compounds as described in U.S. Pat. No. 5,686,228 (Murray et al.), silyl blocked compounds as described in U.S. Pat. No. 5,358,843 (Sakizadeh et al.), vinyl sulfones as described in U.S. Pat. No. 6,143,487 (Philip, et al.), diisocyanate compounds as described in EP 0 600 586A1 (Philip et al.), and tribromomethylketones as described in EP 0 600 587A1 (Oliff et al.).

The photothermographic materials may also include one or more polyhalo antifoggants that include one or more polyhalo substituents including but not limited to, dichloro, dibromo, trichloro, and tribromo groups. The antifoggants can be aliphatic, alicyclic or aromatic compounds, including aromatic heterocyclic and carbocyclic compounds. Particularly useful antifoggants of this type are polyhalo antifoggants, such as those having a —SO$_2$C(X')$_3$ group wherein X' represents the same or different halogen atoms.

Another class of useful antifoggants includes those compounds described in U.S. Pat. No. 6,514,678 (Burgmaier et al.), incorporated herein by reference.

Advantageously, the photothermographic materials also include one or more thermal solvents (also called "heat solvents," "thermosolvents," "melt formers," "melt modifiers," "eutectic formers," "development modifiers," "waxes," or "plasticizers").

By the term "thermal solvent" is meant an organic material that becomes a plasticizer or liquid solvent for at least one of the imaging layers upon heating at a temperature above 60° C. Useful for that purpose are polyethylene glycols having a mean molecular weight in the range of 1,500 to 20,000 described in U.S. Pat. No. 3,347,675 (Henn et al.), urea, methyl sulfonamide and ethylene carbonate as described in U.S. Pat. No. 3,667,959 (Bojara et al.), and compounds described as thermal solvents in *Research Dis-* closure, December 1976, item 15027, pp. 26–28. Other representative examples of such compounds include, but are not limited to, niacinamide, hydantoin, 5,5-dimethylhydantoin, salicylanilide, phthalimide, N-hydroxyphthalimide, N-potassium-phthalimide, succinimide, N-hydroxy-1,8-naphthalimide, phthalazine, 1-(2H)-phthalazinone, 2-acetylphthalazinone, benzanilide, 1,3-dimethylurea, 1,3-diethylurea, 1,3-diallylurea, meso-erythritol, D-sorbitol, tetrahydro-2-pyrimidone, glycouril, 2-imidazolidone, 2-imidazolidone-4-carboxylic acid, and benzenesulfonamide. Combinations of these compounds can also be used including, for example, a combination of succinimide and 1,3-dimethylurea.

It may be advantageous to include a base-release agent or base precursor in the photothermographic materials. Representative base-release agents or base precursors include guanidinium compounds, such as guanidinium trichloroacetate, and other compounds that are known to release a base but do not adversely affect photographic silver halide materials, such as phenylsulfonyl acetates as described in U.S. Pat. No. 4,123,274 (Knight et al.).

Phosphors

In some embodiments, it is also effective to incorporate X-radiation-sensitive phosphors in the chemically sensitized photothermographic materials as described in U.S. Pat. No. 6,573,033 (Simpson et al.) and U.S. Pat. No. 6,440,649 (Simpson et al.), both of which are incorporated herein by reference.

Any conventional or useful storage or prompt-emitting phosphor can be used, singly or in mixtures, in the practice of this invention.

Some particularly useful phosphors are primarily "activated" phosphors known as phosphate phosphors and borate phosphors. Examples of these phosphors are rare earth phosphates, yttrium phosphates, strontium phosphates, or strontium fluoroborates (including cerium activated rare earth or yttrium phosphates, or europium activated strontium fluoroborates) as described in U.S. Publication No. 2005/0233269 (Simpson et al.)

The one or more phosphors used in the practice of this invention are present in the photothermographic materials in an amount of at least 0.1 mole, and preferably from about 0.5 to about 20 mole, per mole of total silver in the photothermographic material. Generally, the amount of total silver is at least 0.002 mol/m². Most preferably, the one or more phosphors and the photosensitive silver halide are incorporated within the same imaging layer that has a dry coating weight within the noted preferred range.

Binders

The photosensitive silver halide (if present), the non-photosensitive source of reducible silver ions, the solid particle dispersion of the ascorbic acid ester reducing agent, antifoggant(s), toner(s), and any other additives are added to and coated in one or more binders using a suitable solvent. Thus, organic solvent-based or aqueous-based formulations are used to prepare the thermally developable materials. Mixtures of different types of hydrophilic and/or hydrophobic binders can also be used.

Preferably, hydrophilic binders and water-dispersible latex polymers are used to provide aqueous-based thermally developable materials. By aqueous based is meant that at least 50 solvent volume % and preferably at least 70 solvent volume % is water.

Examples of useful hydrophilic binders include, but are not limited to, proteins and protein derivatives, gelatin and gelatin derivatives (hardened or unhardened), cellulosic materials, acrylamide/methacrylamide polymers, acrylic/methacrylic polymers, polyvinyl pyrrolidones, polyvinyl alcohols, poly(vinyl lactams), polymers of sulfoalkyl acrylate or methacrylates, hydrolyzed polyvinyl acetates, polyamides, polysaccharides, and other naturally occurring or synthetic vehicles commonly known for use in aqueous-based photographic emulsions (see for example Research Disclosure, item 38957, noted above).

Particularly useful hydrophilic binders are gelatin, gelatin derivatives, polyvinyl alcohols, and cellulosic materials. Gelatin and its derivatives are most preferred, and comprise at least 75 weight % of total binders when a mixture of binders is used.

Aqueous dispersions of water-dispersible latex polymers may also be used, alone or with hydrophilic or hydrophobic binders described herein. Such dispersions are described in U.S. Pat. No. 4,504,575 (Lee), U.S. Pat. No. 6,083,680 (Ito et al), U.S. Pat. No. 6,100,022 (Inoue et al.), U.S. Pat. No. 6,132,949 (Fujita et al.), U.S. Pat. No. 6,132,950 (Ishigaki et al.), U.S. Pat. No. 6,140,038 (Ishizuka et al.), U.S. Pat. No. 6,150,084 (Ito et al.), U.S. Pat. No. 6,312,885 (Fujita et al.), and U.S. Pat. No. 6,423,487 (Naoi), all of which are incorporated herein by reference.

In less preferred embodiments, the components needed for imaging can be added to one or more binders that are predominantly (at least 50% by weight of total binders) hydrophobic in nature. Examples of typical hydrophobic binders include polyvinyl acetals, polyvinyl chloride, polyvinyl acetate, cellulose acetate, cellulose acetate butyrate, polyolefins, polyesters, polystyrenes, polyacrylonitrile, polycarbonates, methacrylate copolymers, maleic anhydride ester copolymers, butadiene-styrene copolymers, and other materials readily apparent to one skilled in the art. Copolymers (including terpolymers) are also included in the definition of polymers. The polyvinyl acetals (such as polyvinyl butyral and polyvinyl formal), cellulose ester polymers, and vinyl copolymers (such as polyvinyl acetate and polyvinyl chloride) are preferred. Particularly suitable binders are polyvinyl butyral resins that are available under the name BUTVAR® from Solutia, Inc.(St. Louis, Mo.) and PIOLOFORM® from Wacker Chemical Company (Adrian, Mich.) and cellulose ester polymers.

Hardeners for various binders may be present if desired. Useful hardeners are well known and include diisocyanate compounds as described for example, in EP 0 600 586B1 (Philip et al.) and vinyl sulfone compounds as described in U.S. Pat. No. 6,143,487 (Philip et al.), and EP 0 640 589A1 (Gathmann et al.), aldehydes and various other hardeners as described in U.S. Pat. No. 6,190,822 (Dickerson et al.).

Where the proportions and activities of the photothermographic materials require a particular developing time and temperature, the binder(s) should be able to withstand those conditions. Generally, it is preferred that the binder does not decompose or lose its structural integrity at 120° C. for 60 seconds. It is more preferred that it does not decompose or lose its structural integrity at 177° C. for 60 seconds.

The polymer binder(s) is used in an amount sufficient to carry the components dispersed therein. Preferably, a binder is used at a level of about 10% by weight to about 90% by weight, and more preferably at a level of about 20% by weight to about 70% by weight, based on the total dry weight of the layer in which it is included. The amount of binders on opposing sides of the support in double-sided materials may be the same or different.

Support Materials

The thermally developable materials comprise a polymeric support that is preferably a flexible, transparent film that has any desired thickness and is composed of one or more polymeric materials. They are required to exhibit dimensional stability during thermal development and to have suitable adhesive properties with overlying layers. Useful polymeric materials for making such supports include, but are not limited to, polyesters (such as polyethylene terephthalate and polyethylene naphthalate), cellulose acetate and other cellulose esters, polyvinyl acetal, polyolefins, polycarbonates, and polystyrenes. Preferred supports are composed of polymers having good heat stability, such as polyesters and polycarbonates. Support materials may also be treated or annealed to reduce shrinkage and promote dimensional stability.

It is also useful to use supports comprising dichroic mirror layers as described in U.S. Pat. No. 5,795,708 (Boutet), incorporated herein by reference.

Also useful are transparent, multilayer, polymeric supports comprising numerous alternating layers of at least two different polymeric materials that preferably reflect at least 50% of actinic radiation in the range of wavelengths to which the photothermographic material is sensitive as described in U.S. Pat. No. 6,630,283 (Simpson et al.) that is incorporated herein by reference.

Support materials can contain various colorants, pigments, antihalation or acutance dyes if desired. For example, blue-tinted supports are particularly useful for providing images useful for medical diagnosis. Support materials may be treated using conventional procedures (such as corona discharge) to improve adhesion of overlying layers, or subbing or other adhesion-promoting layers can be used.

Photothermographic Formulations and Constructions

An organic solvent-based coating formulation for the emulsion layer(s) can be prepared by mixing the emulsion components with one or more hydrophobic binders in a suitable solvent system that usually includes an organic solvent, such as toluene, 2-butanone (methyl ethyl ketone), acetone, or tetrahydrofuran.

Alternatively and preferably, the emulsion components are prepared in a formulation containing a hydrophilic binder (such as gelatin, a gelatin-derivative, or a cellulosic material) or a water-dispersible latex polymer in water or water-organic solvent mixtures to provide aqueous-based coating formulations and thermally developable materials.

The thermally developable materials can contain plasticizers and lubricants such as poly(alcohols) and diols as described in U.S. Pat. No. 2,960,404 (Milton et al.), fatty acids or esters as described in U.S. Pat. No. 2,588,765 (Robijns) and U.S. Pat. No. 3,121,060 (Duane), and silicone resins as described in GB 955,061 (DuPont). The materials can also contain inorganic or organic matting agents as described in U.S. Pat. No. 2,992,101 (Jelley et al.) and U.S. Pat. No. 2,701,245 (Lynn). Polymeric fluorinated surfactants may also be useful in one or more layers as described in U.S. Pat. No. 5,468,603 (Kub).

U.S. Pat. No. 6,436,616 (Geisler et al.), incorporated herein by reference, describes various means of modifying photothermographic materials to reduce what is known as the "woodgrain" effect, or uneven optical density.

The thermally developable materials can include one or more antistatic agents in any of the layers on either or both sides of the support. Conductive components include soluble salts, evaporated metal layers, or ionic polymers as described in U.S. Pat. No. 2,861,056 (Minsk) and U.S. Pat. No. 3,206,312 (Sterman et al.), insoluble inorganic salts as described in U.S. Pat. No. 3,428,451 (Trevoy), electroconductive underlayers as described in U.S. Pat. No. 5,310,640 (Markin et al.), electronically-conductive metal antimonate particles as described in U.S. Pat. No. 5,368,995 (Christian et al.), and electrically-conductive metal-containing particles dispersed in a polymeric binder as described in EP 0 678 776 A1 (Melpolder et al.). Particularly useful conductive particles are the non-acicular metal antimonate particles described in U.S. Pat. No. 6,689,546 (LaBelle et al.). All of the above patents and patent applications are incorporated herein by reference.

Still other conductive compositions include one or more fluorochemicals each of which is a reaction product of $R_f$—$CH_2CH_2$—$SO_3H$ with an amine wherein $R_f$ comprises 4 or more fully fluorinated carbon atoms as described in U.S. Pat. No. 6,699,648 (Sakizadeh et al.) that is incorporated herein by reference.

Additional conductive compositions include one or more fluorochemicals described in more detail in U.S. Pat. No. 6,762,013 (Sakizadeh et al.) that is incorporated herein by reference.

Layers to promote adhesion of one layer to another are also known, as described in U.S. Pat. No. 5,891,610 (Bauer et al.), U.S. Pat. No. 5,804,365 (Bauer et al.), U.S. Pat. No. 4,741,992 (Przezdziecki), and U.S. Pat. No. 5,928,857 (Geisler et al.).

The formulations described herein (including the thermally developable formulations) can be coated by various coating procedures including wire wound rod coating, dip coating, air knife coating, curtain coating, slide coating, or extrusion coating using hoppers of the type described in U.S. Pat. No. 2,681,294 (Beguin). Layers can be coated one at a time, or two or more layers can be coated simultaneously by the procedures described in U.S. Pat. No. 2,761,791 (Russell), U.S. Pat. No. 4,001,024 (Dittman et al.), U.S. Pat. No. 4,569,863 (Keopke et al.), U.S. Pat. No. 5,340,613 (Hanzalik et al.), U.S. Pat. No. 5,405,740 (LaBelle), U.S. Pat. No. 5,415,993 (Hanzalik et al.), U.S. Pat. No. 5,525,376 (Leonard), U.S. Pat. No. 5,733,608 (Kessel et al.), U.S. Pat. No. 5,849,363 (Yapel et al.), U.S. Pat. No. 5,843,530 (Jerry et al.), and U.S. Pat. No. 5,861,195 (Bhave et al.), and GB 837,095 (Ilford), all of which are incorporated herein by reference. A typical coating gap for the emulsion layer can be from about 10 to about 750 µm, and the layer can be dried in forced air at a temperature of from about 20° C. to about 100° C. It is preferred that the thickness of the layer be selected to provide maximum image densities greater than about 0.2, and more preferably, from about 0.5 to 5.0 or more, as measured by a MacBeth Color Densitometer Model TD 504.

For example, after or simultaneously with application of the emulsion formulation to the support, the outermost overcoat formulation described below can be applied over the emulsion formulation(s).

Preferably, two or more layer formulations are applied simultaneously to a film support using slide coating, the first layer being coated on top of the second layer while the second layer is still wet, using the same or different solvents.

In other embodiments, a "carrier" layer formulation comprising a single-phase mixture of the two or more polymers described above may be applied directly onto the support and thereby located underneath the emulsion layer(s) as described in U.S. Pat. No. 6,355,405 (Ludemann et al.), incorporated herein by reference. The carrier layer formulation can be applied simultaneously with application of the emulsion layer formulation(s).

Mottle and other surface anomalies can be reduced in the materials by incorporation of a fluorinated polymer as described for example in U.S. Pat. No. 5,532,121 (Yonkoski et al.) or by using particular drying techniques as described, for example in U.S. Pat. No. 5,621,983 (Ludemann et al.).

While the first and second layers can be coated on one side of the film support, manufacturing methods can also include forming on the opposing or backside of the polymeric support, one or more additional layers, including a conductive layer, antihalation layer, or a layer containing a matting agent (such as silica), or a combination of such layers. Alternatively, one backside layer can perform all of the desired functions.

It is particularly contemplated that the thermally developable materials can include emulsion layers on both sides of the support and/or an antihalation underlayer beneath at least one emulsion layer. Thus, the outermost protective layers described below can be disposed on both sides of the support.

The photothermographic materials may also usefully include a magnetic recording material as described in *Research Disclosure,* Item 34390, November 1992, or a transparent magnetic recording layer such as a layer containing magnetic particles on the underside of a transparent support as described in U.S. Pat. No. 4,302,523 (Audran et al.).

To promote image sharpness, photothermographic materials can contain one or more layers containing acutance and/or antihalation dyes. These dyes are chosen to have absorption close to the exposure wavelength and are designed to absorb scattered light. One or more antihalation compositions may be incorporated into one or more antihalation backing layers, underlayers, or overcoats. Additionally, one or more acutance dyes may be incorporated into one or more frontside layers.

Dyes useful as antihalation and acutance dyes include squaraine dyes described in U.S. Pat. No. 5,380,635 (Gomez et al.) and U.S. Pat. No. 6,063,560 (Suzuki et al.), and EP 1083 459A1 (Kimura), indolenine dyes described in EP 0 342 810A1 (Leichter), and cyanine dyes described in U.S. Pat. No. 6,689,547 (Hunt et al.), all incorporated herein by reference.

It may also be useful to employ compositions including acutance or antihalation dyes that will decolorize or bleach with heat during processing as described in U.S. Pat. No. 5,135,842 (Kitchin et al.), U.S. Pat. No. 5,266,452 (Kitchin et al.), U.S. Pat. No. 5,314,795 (Helland et al.), and U.S. Pat. No. 6,306,566, (Sakurada et al.), and Japanese Kokai 2001-142175 (Hanyu et al.) and 2001-183770 (Hanye et al.). Useful bleaching compositions are described in Japanese Kokai 11-302550 (Fujiwara), 2001-109101 (Adachi), 2001-51371 (Yabuki et al.), and 2000-029168 (Noro). All of the noted publications are incorporated herein by reference.

Other useful heat-bleachable backside antihalation compositions can include a radiation absorbing compound such as an oxonol dye and various other compounds used in combination with a hexaarylbiimidazole (also known as a "HABI"), or mixtures thereof. HABI compounds are described in U.S. Pat. No. 4,196,002 (Levinson et al.), U.S. Pat. No. 5,652,091 (Perry et al.), and U.S. Pat. No. 5,672,562 (Perry et al.), all incorporated herein by reference. Examples of such heat-bleachable compositions are described for example in U.S. Pat. No. 6,455,210 (Irving et al.), U.S. Pat. No. 6,514,677 (Ramsden et al.), and U.S. Pat. No. 6,558,880 (Goswami et al.), all incorporated herein by reference.

Under practical conditions of use, these compositions are heated to provide bleaching at a temperature of at least 90° C. for at least 0.5 seconds (preferably, at a temperature of from about 100° C. to about 200° C. for from about 5 to about 20 seconds).

Imaging/Development

The photothermographic materials can be imaged in any suitable manner consistent with the type of material, using any suitable imaging source (typically some type of radiation or electronic signal). In some embodiments, the materials are sensitive to radiation in the range of from about at least 300 nm to about 1400 nm, and preferably from about 300 m to about 850 nm because of the use of appropriate spectral sensitizing dyes. In one preferred embodiment, the materials are sensitive to radiation of from about 300 nm to about 450 nm, preferably from about 360 to about 420 nm, and more preferably from about 380 to about 420 nm.

Imaging can be achieved by exposing the photothermographic materials to a suitable source of radiation to which they are sensitive, including ultraviolet radiation, visible light, near infrared radiation and infrared radiation to provide a latent image. Suitable exposure means are well known and include incandescent or fluorescent lamps, xenon flash lamps, lasers, laser diodes, light emitting diodes, infrared lasers, infrared laser diodes, infrared light-emitting diodes, infrared lamps, or any other ultraviolet, visible, or infrared radiation source readily apparent to one skilled in the art such as described in *Research Disclosure,* item 38957 (noted above).

In some embodiments, the photothermographic materials can be indirectly imaged using an X-radiation imaging source and one or more prompt-emitting or storage X-ray sensitive phosphor screens arranged adjacent to the photothermographic material. The phosphors emit suitable radiation to expose the photothermographic material.

In other embodiments, the photothermographic materials can be imaged directly using an X-radiation imaging source to provide a latent image.

In still other embodiments, the photothermographic materials can be directly imaged using an X-radiation imaging source and one or more X-ray sensitive prompt emitting or storage phosphors incorporated within the photothermographic material.

Imaging of the thermographic materials is carried out using a suitable imaging source of thermal energy such as a thermal print head.

Thermal development conditions will vary, depending on the construction used but will typically involve heating the thermally sensitive material at a suitably elevated temperature, for example, at from about 50° C. to about 250° C. for a sufficient period of time, generally from about 1 to about 120 seconds. Heating can be accomplished using any suitable heating means. A preferred heat development procedure for photothermographic materials includes heating at from 130° C. to about 170° C. for from about 10 to about 25 seconds. A particularly preferred development procedure is heating at about 150° C. for 15 to 25 seconds.

Use as a Photomask

The thermographic and photothermographic materials can be sufficiently transmissive in the range of from about 350 to about 450 nm in non-imaged areas to allow their use in a method where there is a subsequent exposure of an ultraviolet or short wavelength visible radiation sensitive imageable medium. The heat-developed materials absorb ultraviolet or short wavelength visible radiation in the areas where there is a visible image and transmit ultraviolet or short wavelength visible radiation where there is no visible image. The heat-developed materials may then be used as a mask and positioned between a source of imaging radiation (such as an ultraviolet or short wavelength visible radiation energy source) and an imageable material that is sensitive to such imaging radiation, such as a photopolymer, diazo material, photoresist, or photosensitive printing plate. Exposing the imageable material to the imaging radiation through the visible image in the exposed and heat-developed thermographic or photothermographic material provides an image in the imageable material. This method is particularly useful where the imageable medium comprises a printing plate and the photothermographic material serves as an imagesetting film.

Thus, in some other embodiments wherein the thermographic or photothermographic material comprises a transparent support, the image-forming method further comprises, after step (A) or steps (A') and (B) noted above:
(C) positioning the exposed and heat-developed photothermographic material between a source of imaging radiation and an imageable material that is sensitive to the imaging radiation, and
(D) thereafter exposing the imageable material to the imaging radiation through the visible image in the exposed and heat-developed photothermographic material to provide an image in the imageable material.

The transparent imaged thermographic materials can be similarly used as photomasks.

Imaging Assemblies

In preferred embodiments, the photothermographic materials are used in association with one or more phosphor intensifying screens and/or metal screens in what is known as "imaging assemblies." Duplitized X-radiation or visible radiation-sensitive photothermographic materials are preferably used in combination with two adjacent intensifying screens, one screen in the "front" and one screen in the "back" of the material. The front and back screens can be appropriately chosen depending upon the type of emissions desired, the desired photicity, emulsion speeds, and percent crossover. A metal (such as copper or lead) screen can also be included if desired.

There are a wide variety of phosphors known in the art that can be formulated into phosphor intensifying screens as described in hundreds of publications including U.S. Pat. No. 6,573,033 (noted above) and references cited therein. It is particularly desired that the phosphor be chosen to emit radiation of a wavelength to which the photothermographic material is sensitive (for example, most preferably at from about 380 to about 420 nm).

Imaging assemblies can be prepared by arranging a suitable photothermographic material in association with one or more phosphor intensifying screens, and one or more metal screens.

The following examples are provided to illustrate the practice of the present invention and the invention is not meant to be limited thereby.

Materials and Methods for the Examples

All materials used in the following examples can be prepared using known synthetic procedures or are readily available from standard commercial sources, such as Aldrich Chemical Co. (Milwaukee, Wis.) unless otherwise specified. All percentages are by weight unless otherwise indicated.

BYK-022 is a defoamer and is available from Byk-Chemie Corp. (Wallingford, Conn.).

BZT refers to benzotriazole. AgBZT refers to the silver salt of benzotriazole.

CELVOL™ V203S is a poly(vinylalcohol) and is available from Celanese Corp. (Dallas, Tex.).

D-iso-ascorbic acid 6-O-palmitate can be prepared according to the method described in U.S. Pat. No. 4,151,178 (Seib et al.).

L-Ascorbic acid 6-O-palmitate is available from Alfa Aesar Corp., (Ward Hill, Mass.).

Monopalmitin and monostearin are available from TCI Tokyo Kasei Kogyo Co., LTD., (Tokyo, Japan). Monopalmitin is the mono-ester of palmitic acid and glycerol. Monostearin is the mono-ester of stearic acid and glycerol.

TRITON® X-114 is a surfactant and is available from Dow Chemical Corp. (Midland Mich.).

Vinol 523 is partially hydrolyzed (87 to 89%) poly(vinyl alcohol). It was obtained from Air Products and Chemicals, Inc. (Allentown, Pa.).

ZONYL FS300 is a nonionic fluorosurfactant that is available from E. I. DuPont de Nemours & Co. (Wilmington, Del.). It is a fluorinated polyethyleneoxide alcohol.

Compound A-1 is described in U.S. Pat. No. 6,605,418 (noted above) and is believed to have the following structure.

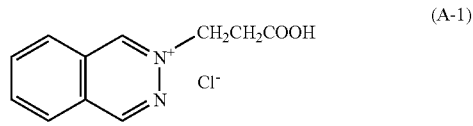

Compound SS-1a is described in U.S. Pat. No. 6,296,998 (Eikenberry et al.) and is believed to have the following structure.

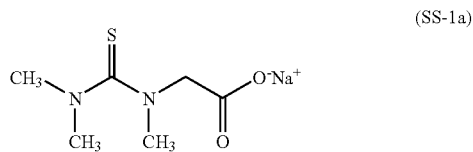

Blue sensitizing dye SSD-1 is believed to have the following structure.

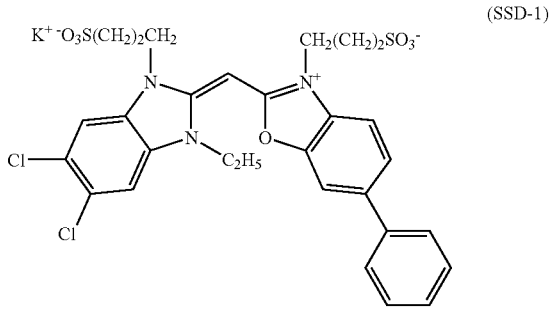

Compound T-1 is 2,4-dihydro-4-(phenylmethyl)-3H-1,2,4-triazole-3-thione. It is believed to have the structure shown below. It is drawn as the thiol form but may also exist as the thione tautomer. The silver salt of this compound is referred to as AgT-1. The sodium salt of this compound is referred to as NaT-1

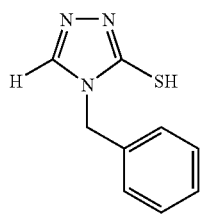
(T-1)

Bisvinyl sulfonyl methane (VS-1) is 1,1'(methylenebis(sulfonyl))-bis-ethene and is believed to have the following structure.

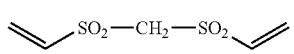
(VS-1)

Gold sensitizer Compound GS-1 is believed to have the following structure.

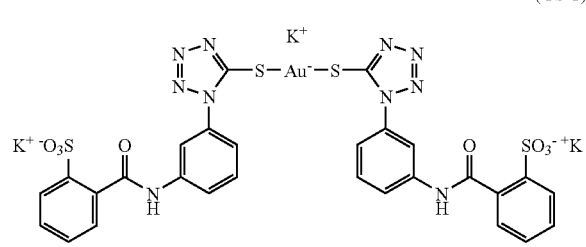
(GS-1)

Densitometry measurements were carried out on an X-Rite® Model 310 densitometer that is available from X-Rite Inc. (Grandville, Mich.).

Median particle size was measured by light scattering using a Microtrac UPA 150 ultrafine particle analyzer made by Microtrac, Inc. (Montgomeryville, Md.).

Preparation of Reducing Agent Dispersions

Preparation of Comparative Dispersion CD-1:

A solid particle dispersion of a reducing agent was prepared by combining 20 weight % L-ascorbic acid 6-O-palmitate, 2 weight % CELVOL™ V203S poly(vinyl alcohol), 0.6 weight % TRITON® X-114 surfactant, 0.02 weight % of BYK-022, and 77.38 weight % of high purity water. The mixture was circulated in a media mill with 0.7 mm zirconium silicate ceramic beads until the dispersion achieved a median particle size of approximately 0.45 μm (micrometers) as measured by light scattering. This required about 7 hours. Examination of the final dispersion by transmitted light microscopy at 1000× magnification showed well-dispersed particles, all below 1 μm.

Preparation of Inventive Dispersion ID-1:

Inventive Dispersion ID-1 was prepared in the same manner as Comparative Dispersion CD-1 except 1 weight % D-iso-ascorbic acid was added to and milled with the mixture. The final dispersion contained a median particle size of approximately 0.45 μm as measured by light scattering. Examination of the final dispersion by transmitted light microscopy at 1000× magnification showed well-dispersed particles, all below 1 μm.

Preparation of Inventive Dispersion ID-2:

Inventive Dispersion ID-2 was prepared in the same manner as dispersion CD-1 except 1 weight % monopalmitin was added to and milled with the mixture. The final dispersion contained a median particle size of approximately 0.45 μm as measured by light scattering. Examination of the final dispersion by transmitted light microscopy at 1000× magnification showed well-dispersed particles, all below 1 μm.

Preparation of Inventive Dispersion ID-3:

Inventive Dispersion ID-3 was prepared in the same manner as Comparative Dispersion 1 except that 1 weight % monostearin was added to and milled with the mixture in a DC mini-mill as described in U.S. Pat. No. 5,593,097 (Corbin), with 0.7 mm zirconium silicate beads for 90 minutes. The final dispersion contained a median particle size of approximately 0.37 μm as measured by light scattering. Examination of the final dispersion by transmitted light microscopy showed well-dispersed particles, all below 1 μm.

Preparation of Inventive Dispersion ID-4:

The following example demonstrates the use of alkyl carboxylic acids as growth modifiers for reducing agents in thermally developable imaging materials.

Inventive Dispersion ID-4 was prepared in the same manner as Inventive Dispersion ID-3 except 1 weight % palmitic acid, instead of monopalmitin, was added to and milled with the mixture. The final dispersion contained a median particle size of approximately 0.57 μm as measured by light scattering. Examination of the final dispersion by transmitted light microscopy showed well-dispersed particles, all below 1 μm.

Preparation of Comparative Dispersion CD-2:

The following example demonstrates that growth modifiers and methods such as those described in U.S. Pat. No. 5,750,323 (noted above), do not prevent the unwanted particle growth of the host molecule.

Comparative dispersion CD-2 was prepared in the same manner as Inventive Dispersion ID-3 except 1 weight % L-ascorbic acid dipalmitate, instead of monopalmitin, was added to and milled with the mixture. The final dispersion contained a median particle size of approximately 0.70 μm as measured by light scattering. Examination of the final dispersion by transmitted light microscopy showed well-dispersed particles, all below 1 μm.

Storage of Dispersions:

Samples of all five dispersions were stored for 24 hours at 50° C. Following this treatment, the dispersions were again examined by transmitted light microscopy and the particle size was again measured by light scattering. The results, shown below in TABLE I, demonstrate that comparative dispersions CD-1 and CD-2 exhibited unacceptable particle growth after 24 hours of storage while the particle size of inventive dispersions ID-1 and ID-2 did not change and the particle size of inventive dispersion ID-3 was still acceptable.

TABLE I

| Dispersion | Median Particle Size After Preparation | Microscopy at 1000X After Preparation | Median Particle Size After 24 hrs at 50° C. | Microscopy at 1000X After 24 hrs at 50° C. |
|---|---|---|---|---|
| CD-1 | 0.45 μm | All particles <1 μm | 1.5 μm | Long needles >5 μm |
| CD-2 | 0.70 μm | All particles <1 μm | 0.90 μm | Long needles >5 μm |
| ID-1 | 0.45 μm | All particles <1 μm | 0.45 μm | All particles <1 μm |
| ID-2 | 0.45 μm | All particles <1 μm | 0.44 μm | All particles <1 μm |
| ID-3 | 0.37 μm | All particles <1 μm | 0.68 μm | All particles <1 μm |
| ID-4 | 0.57 μm | All particles <1 μm | 0.81 μm | All particles <1 μm |

EXAMPLE 1

Preparation of Aqueous-Based Photothermopraphic Materials

Aqueous-based photothermographic materials of this invention were prepared in the following manner.

Preparation of Co-Precipitated AaBZT/AgT-1:

A co-precipitated AgBZT/AgT-I emulsion was prepared as described in copending and commonly assigned U.S. Ser. No. 10/935,384 (filed on even date herewith by Hasberg, Lynch, Chen-Ho, and Zou).

A stirred reaction vessel was charged with 900 g of lime-processed gelatin, and 6000 g of deionized water. The mixture in the reaction vessel was adjusted to a pH of 8.9 with 2.5N sodium hydroxide solution, and 0.8 g of Solution A (prepared below) was added to adjust the solution vAg to 80 mV. The temperature of the reaction vessel was maintained at approximately 50° C.

Solution A was prepared containing 216 g/kg of benzotriazole, 710 g/kg of deionized water, and 74 g/kg of sodium hydroxide.

Solution B was prepared containing 362 g/kg of silver nitrate and 638 g/kg of deionized water.

Solution C was prepared containing 336 g/kg of T-1, 70 g/kg of sodium hydroxide and 594 g/kg of deionized water.

Solutions A and B were then added to the reaction vessel by conventional controlled double-jet addition. Solution B was continuously added at the flow rates and for the times given in TABLE II, while maintaining constant vAg and pH in the reaction vessel. After consumption of 97.4% total silver nitrate solution (Solution B), Solution A was replaced with Solution C and the precipitation was continued. Solution B and Solution C were added to the reaction vessel also by conventional controlled double-jet addition, while maintaining constant vAg and pH in the reaction vessel.

The AgBZT/AgT-1 co-precipitated emulsions were washed by conventional ultrafiltration process as described in *Research Disclosure*, Vol. 131, March 1975, Item 13122. The pH of AgBZT/AgT-1 emulsions was adjusted to 6.0 using 2.0N sulfuric acid. Upon cooling the emulsion solidified and was stored.

TABLE II

| | Time [min] | Solution B Flow Rate [ml/min] |
|---|---|---|
| Flow Rate 1 | 20 | 25 |
| Flow Rate 2 | 41 | 25–40 |
| Flow Rate 3 | 30 | 40–80 |

Preparation of Silver Halide Emulsion:

A reaction vessel equipped with a stirrer was charged with 6 liters of water containing 2.1 g of deionized oxidized-methionine lime-processed bone gelatin, 3.49 g of sodium bromide, and an antifoamant (at pH=5.8). The solution was held at 39° C. for 5 minutes. Simultaneous additions were then made of 50.6 ml of 0.3 molar silver nitrate and 33.2 ml of 0.448 molar sodium bromide over 1 minute. Following nucleation, 3.0 ml of a 0.1 M solution of sulfuric acid was added. After 1 minute 15.62 g sodium chloride plus 375 mg of sodium thiocyanate were added and the temperature was increased to 54° C. over 9 minutes. After a 5-minute hold, 79.6 g of deionized oxidized-methionine lime-processed bone gelatin in 1.52 liters of water containing additional antifoamant at 54° C. were then added to the reactor. The reactor temperature was held for 7 minutes (pH=5.6).

During the next 36.8 minutes, the first growth stage took place (at 54° C.), in three segments, wherein solutions of 0.3 molar $AgNO_3$, 0.448 molar sodium bromide, and a 0.16 molar suspension of silver iodide (Lippmann) were added to maintain a nominal uniform iodide level of 3.2 mole %. The flow rates during this growth stage were increased from 9 to 42 ml/min (silver nitrate) and from 0.73 to 3.3 ml/min (silver iodide). The flow rates of the sodium bromide were allowed to fluctuate as needed to effect a monotonic pBr shift of 2.45 to 2.12 over the first 12 minutes, of 2.12 to 1.90 over the second 12 minutes, and of 1.90 to 1.67 over the last 12.8 minutes. This was followed by a 1.5 minute hold.

During the next 59 minutes the second growth stage took place (at 54° C.) during which solutions of 2.8 molar silver nitrate, and 3.0 molar sodium bromide, and a 0.16 molar suspension of silver iodide (Lippmann) were added to maintain a nominal iodide level of 3.2 mole %. The flow rates during this segment were increased from 10 to 39.6 ml/min (silver nitrate) and from 5.3 to 22.6 ml/min (silver iodide). The flow rates of the sodium bromide were allowed to fluctuate as needed to effect a monotonic pBr shift of 1.67 to 1.50. This was followed by a 1.5 minute hold.

During the next 34.95 minutes, the third growth stage took place during which solutions of 2.8 molar silver nitrate, 3.0 molar sodium bromide, and a 0.16 molar suspension of silver iodide (Lippmann) were added to maintain a nominal iodide level of 3.2 mole %. The flow rates during this segment were 39.6 ml/min (silver nitrate) and 22.6 ml/min (silver iodide). The temperature was linearly decreased to 35° C. during this segment. At the $23^{rd}$ minute of this segment a 50 ml aqueous solution containing 0.85 mg of an Iridium dopant ($K_2[Ir(5-Br-thiazole)Cl_5]$) was added. The flow rate of the sodium bromide was allowed to fluctuate to maintain a constant pBr of 1.50.

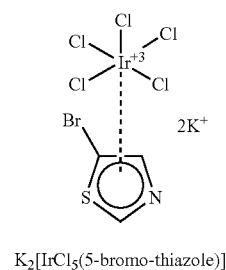

K₂[IrCl₅(5-bromo-thiazole)]

A total of 8.5 moles of silver iodobromide (3.2% bulk iodide) were formed. The resulting emulsion was washed using ultrafiltration. Deionized lime-processed bone gelatin (326.9 g) was added along with a biocide and pH and pBr were adjusted to 6 and 2.5 respectively.

The resulting emulsion was examined by Scanning Electron Microscopy. Tabular grains accounted for greater than 99% of the total projected area. The mean ECD of the grains was 2.522 μm. The mean tabular thickness was 0.049 μm.

This emulsion was spectrally sensitized with 3.31 mmol of blue sensitizing dye SSD-1 per mole of silver halide. This dye quantity was split 80%/20% with the majority being added before chemical sensitization and the remainder afterwards. Chemical sensitization was carried out using 0.0085 mmol of sulfur sensitizer (compound SS-1a) and 0.00079 mmol per mole of silver halide of gold sensitizer (compound GS-1) at 60° C. for 6.3 minutes.

Preparation of Photothermopraphic Material:

Component A: AgBZT/AgT-1 dispersion and gelatin (35% gelatin/65% water) were placed in a stainless steel container and heated to 50° C. for 15 minutes to melt the material. A 5% aqueous solution of 3-methylbenzothiazolium iodide was added with stirring and held for 10 minutes. The sodium salt of benzotriazole was added, the mixture was stirred for 5 minutes, and was then cooled to 40° C. Mixing for 30 minutes was followed by addition of 2.5 N sulfuric acid to adjust the pH to 5.0. ZONYL FS300 surfactant was then added, followed by a 12% aqueous solution of Compound A-1.

Component B: A portion of the tabular-grain silver halide emulsion prepared above was placed in a stainless steel container and melted at 40° C.

Component C: Component C was prepared by adding the dry materials to water and heating to 62° C. until dissolved, followed by cooling to 25° C., and then followed by addition and mixing of Reducing Agent Dispersion.

Components A, B, and C were mixed immediately before coating to form a photothermographic emulsion formulation. Each formulation was coated as a single layer on a 7 mil (178 μm) transparent, blue-tinted poly(ethylene terephthalate) film support using a knife coater to form an imaging layer having the dry composition shown below in TABLE III. Samples were dried at 125° F. (51.7° C.) for 7.5 minutes.

TABLE III

| Component | Material | Dry Coating Weight [g/m²] |
|---|---|---|
| A | Silver (from AgBZT/AgT-1) | 1.07 |
| A | Lime processed gelatin | 1.61 |
| A | 3-Methylbenzothiazolium Iodide | 0.05 |
| A | Sodium benzotriazole | 0.05 |

TABLE III-continued

| Component | Material | Dry Coating Weight [g/m²] |
|---|---|---|
| A | Mercaptotriazole compound NaT-1 | 0.05 |
| A | ZONYL FS300 surfactant | 0.03 |
| B | Silver (from AgBrI emulsion) | 0.19 |
| C | Succinimide | 0.11 |
| C | Dimethylurea | 0.19 |
| C | Pentaerythritol | 0.35 |
| C | Compound VS-1 | 0.06 |
| C | L-ascorbic acid 6-O-palmitate from dispersions of TABLE I | 2.8 |

Sensitometry measurements were made on a custom built computer-scanned sensitometer and are believed to be comparable to measurements from commercially available sensitometers. The photothermographic materials were exposed for 0.02 seconds through a 0–3 graduated density 21 step tablet. The light source was a General Electric Quartzline 750 watt tungsten lamp tuned to 2850° K. color temperature and filtered with blue glass and 1.0 neutral density filters to simulate a blue light-emitting fluorescent intensifying screen. The exposed materials were thermally developed in a heated chamber for 18 seconds at 150° C.

Densitometry measurements were made on a custom built computer-scanned densitometer and meeting ISO Standards 5-2 and 5-3 and are believed to be comparable to measurements from commercially available densitometers. Densities of the stepped images were then measured with a computer densitometer using a filter appropriate to the sensitivity of the photothermographic material to obtain graphs of density versus log exposure (that is, D log E curves). Dmin is the density of the non-exposed areas after development and it is the average of the eight lowest density values. "Relative Speed" was determined at a density of 1.0 above Dmin. The values were normalized with Sample 1-1 assigned a Relative Speed of 100. Dmax is the density of the highest exposure step on the image. The results, shown below in TABLE IV, demonstrate that inventive examples (I-2 and I-3) exhibit similar imaging characteristics to comparative example (CD-1). That is, the addition of the particle growth stabilizer had no detrimental effect on the imaging characteristics of the inventive films.

TABLE IV

| Sample | Dispersion | $D_{min}$ | $D_{max}$ | Relative Speed |
|---|---|---|---|---|
| 1-1 | CD-1 | 0.3 | 2.1 | 100 |
| 1-2 | ID-1 | 0.3 | 2.0 | 73 |
| 1-3 | ID-2 | 0.3 | 1.8 | 126 |

EXAMPLE 2

Preparation of Aqueous-Based Thermographic Materials

The following example demonstrates that reducing agent dispersions of L-ascorbic acid 6-O-palmitate within the scope of the present invention can be used in thermographic materials.

A 20 cm×1 cm strip of thermographic material was prepared using the materials described in Example 1 but without photosensitive silver bromoiodide emulsion (Component B). The strip was heated over a Master Appliance Corp. (Racine, Wis., USA) heat gun for 10 seconds. A thermocouple probe placed over the heat gun for 10 seconds measured a temperature range of 168–176° C. Densitometry measurements were carried out on an X-Rites Model 310 densitometer. Optical densities of both the heated areas and unheated areas are shown below in Table V.

TABLE V

| Sample | Dispersion | Density of Unheated Areas | Density of Heated Areas |
|---|---|---|---|
| 2-1 | CD-1 | 0.3 | 2.3 |
| 2-2 | ID-1 | 0.3 | 2.3 |
| 2-3 | ID-2 | 0.3 | 2.6 |

The invention has been described in detail with particular reference to certain preferred embodiments thereof, but it will be understood that variations and modifications can be effected within the spirit and scope of the invention.

The invention claimed is:

1. A method for making an aqueous particulate dispersion comprising:
   A) mixing an ascorbic acid ester with a particle growth modifier that is present in an amount of at least 0.5 and less than 50 weight % based on the weight of said ascorbic acid ester, and
   B) dispersing said ascorbic acid ester and said particle growth modifier together in an aqueous medium to form an aqueous dispersion,
   wherein said particle growth modifier is an alkyl carboxylic acid having from 8 to 22 carbon atoms, an alkyl ester of glycerol wherein the alkyl moiety has from 8 to 22 carbon atoms, or a stereoisomer of said ascorbic acid ester.

2. The method of claim 1 wherein said ascorbic acid ester and said particle growth modifier are dispersed by milling them as an aqueous slurry.

3. The method of claim 1 wherein said ascorbic acid ester has an ester moiety having from 8 to 22 carbon atoms.

4. The method of claim 1 wherein said ascorbic acid ester is mixed with a particle growth modifier that is present in an amount of from about 1 to about 10 weight % based on the weight of said ascorbic acid ester.

5. The method of claim 1 wherein said particle growth modifier is a stereoisomer of said ascorbic acid ester.

6. The method of claim 1 wherein said particle growth modifier is a mono-alkyl ester of glycerol wherein the alkyl moiety has from 12 to 22 carbon atoms.

7. The method of claim 1 wherein said particle growth modifier is an alkyl carboxylic acid having from 12 to 22 carbon atoms.

8. The method of claim 1 wherein said ascorbic acid ester is present in said aqueous dispersion in an amount of from about 1 to about 50 weight %.

9. The method of claim 1 wherein said ascorbic acid ester is L-ascorbic acid 6-O-palmitate and said particle growth modifier is D-iso-ascorbic acid 6-O-palmitate, palmitic acid, monopalmitin, or monostearin.

10. A stable aqueous solid particle dispersion prepared by the method of claim 1.

11. A stable aqueous solid particle dispersion comprising solid particles of an ascorbic acid ester that is present in an amount of from about 1 to about 50 weight %, and a particle growth modifier that is present in an amount of at least 0.5 and less than 50 weight % based on the weight of said ascorbic acid ester, said particle growth modifier is an alkyl carboxylic acid having from 8 to 22 carbon atoms, an alkyl ester of glycerol wherein the alkyl moiety has from 8 to 22 carbon atoms, or a stereoisomer of said ascorbic acid ester.

12. The dispersion of claim 11 wherein said ascorbic acid ester solid particles have an average particle size of less than 5 μm.

13. The dispersion of claim 12 wherein said ascorbic acid ester solid particles have an average particle size of from about 0.01 to about 1 μm.

14. The dispersion of claim 11 wherein said ascorbic acid ester has an ester moiety having from 8 to 22 carbon atoms, and said particle growth modifier is present in an amount of from about 1 to about 10 weight % based on the weight of said ascorbic acid ester.

15. The dispersion of claim 11 wherein said particle growth modifier is a stereoisomer of said ascorbic acid ester.

16. The dispersion of claim 11 wherein said ascorbic acid ester is L-ascorbic acid 6-O-palmitate and said particle growth modifier is D-iso-ascorbic acid 6-O-palmitate, palmitic acid, monopalmitin, or monostearin.

17. A thermally developable imaging material comprising a support and having thereon one or more imaging layers comprising a hydrophilic binder or water-dispersible latex polymer and in reactive association:
   a) a source of reducible silver ions comprising an organic silver salt, and
   b) a reducing agent for said reducible silver ions,
   wherein said reducing agent is present in the form of stable aqueous solid particle dispersion comprising solid particles of an ascorbic acid ester.

18. The material of claim 17 further comprising a particle growth modifier that is present in an amount of at least 0.5 and less than 50 weight % based on the weight of said ascorbic acid ester, said particle growth modifier is an alkyl carboxylic acid having from 8 to 22 carbon atoms, a mono-alkyl ester of glycerol wherein the alkyl moiety has from 8 to 22 carbon atoms, or a stereoisomer of said ascorbic acid ester, and said solid ascorbic acid ester particles have an average size of less than 5 μm.

19. The material of claim 17 wherein said source of reducible silver ions comprises a silver salt of an N-heterocyclic compound.

20. The material of claim 19 wherein said source of reducible silver ions comprises a silver salt of a compound containing an imino group, and said hydrophilic binder in said one or more imaging layers is gelatin or a derivative thereof, a cellulosic material, or a poly(vinyl alcohol).

21. The material of claim 16 that is a photothermographic material that further comprises a photosensitive silver halide.

22. A black-and-white photothermographic material comprising a support and having thereon one or more aqueous-based imaging layers comprising a hydrophilic binder or water-dispersible latex polymer and in reactive association:
   a) a source of reducible silver ions comprising a silver salt of an N-heterocyclic compound,
   b) a reducing agent for said reducible silver ions, and
   c) a photosensitive silver halide,
   wherein said reducing agent is present in the form of stable aqueous solid particle dispersion comprising solid particles of an ascorbic acid ester, said solid particle dispersion further comprising a particle growth modifier that is present in an amount of at least 0.5 and less than 50 weight % based on the weight of said ascorbic acid ester, said particle growth modifier is an alkyl carboxylic acid having from 8 to 22 carbon atoms, a mono-alkyl ester of glycerol wherein the alkyl moiety has from 8 to 22 carbon atoms, or a stereoisomer of said ascorbic acid ester.

23. The material of claim 22 wherein said ascorbic acid ester is present in an amount of from about 0.3 to about 1 mol/mol of total silver.

24. The material of claim 22 wherein said ascorbic acid ester has an ester moiety having from 8 to 22 carbon atoms, and said particle growth modifier is present in an amount of from about 1 to about 10 weight % based on the weight of said ascorbic acid ester.

25. The material of claim 22 wherein said particle growth modifier is a stereoisomer of said ascorbic acid eater.

26. The material of claim 22 wherein said particle growth modifier is a mono-alkyl ester of glycerol wherein the alkyl moiety has from 12 to 22 carbon atoms.

27. The material of claim 22 wherein said particle growth modifier is an alkyl carboxylic acid having from 12 to 22 carbon atoms.

28. The material of claim 22 wherein said photosensitive silver halide is present as tabular grains of silver halide, said source of reducible silver ions comprises a silver salt of a compound containing an imino group, and said hydrophilic binder in said one or more imaging layers is gelatin or a derivative thereof, a cellulosic material, or a poly(vinyl alcohol).

29. A black-and-white photothermographic material comprising a support having on a frontside thereof,
a) one or more frontside imaging layers comprising a hydrophilic polymer or water-dispersible latex polymer as the binder, and in reactive association, a photosensitive silver halide, a non-photosensitive source of reducible silver ions that includes a silver salt of a compound containing an imino group, and a reducing agent for said non-photosensitive source reducible silver ions, and said material comprising on the backside of said support, one or more backside imaging layers comprising a hydrophilic polymer or a water-dispersible latex polymer as the binder, and in reactive association, a photosensitive silver halide, a non-photosensitive source of reducible silver ions that includes a silver salt of a compound containing an imino group, and a reducing agent for said non-photosensitive source reducible silver ions, and wherein said one or more imaging layers on both sides of said support have the same or different composition, and b) an outermost protective layer over said one or more imaging layers on both sides of said support, each protective layer having the same or different composition, wherein the reducing agent on both sides of said support is the same or different and is present in the form of stable aqueous solid particle dispersion comprising solid particles of an ascorbic acid ester, said solid particle dispersion further comprising a particle growth modifier that is present in an amount of at least 0.5 and less than 50 weight % based on the weight of said ascorbic acid ester, said particle growth modifier is an alkyl carboxylic acid having from 8 to 22 carbon atoms, a mono-alkyl ester of glycerol wherein the alkyl moiety has from 8 to 22 carbon atoms, or a stereoisomer of said ascorbic acid ester.

30. The material of claim 29 wherein said photosensitive silver halide on both sides of said support is spectrally sensitized to a wavelength of from about 300 to about 450 nm.

31. The material of claim 29 that is a symmetric material.

32. A black-and-white photothermographic material comprising a support having on a frontside thereof,
a) one or more frontside imaging layers comprising gelatin or a derivative thereof, a cellulosic material, or a poly(vinyl alcohol) as the binder, and in reactive association, a photosensitive silver bromide or iodobromide in the form of tabular grains that is spectrally sensitized to radiation having a wavelength of from about 380 to about 420 nm, a non-photosensitive silver salt of a benzotriazole, and a reducing agent for said non-photosensitive source of reducible silver ions, and said material comprising on the backside of said support, one or more backside imaging layers comprising a gelatin or a derivative thereof, a cellulosic material, or a poly(vinyl alcohol) as the binder, and in reactive association, a photosensitive silver bromide or iodobromide in the form of tabular grains that is spectrally sensitized to radiation having a wavelength of from about 380 to about 420 nm, a non-photosensitive silver salt of a benzotriazole, and a reducing agent for said non-photosensitive source of reducible silver ions, and wherein said one or more imaging layers on both sides of said support have essentially the same composition, and b) an outermost protective layer over said one or more imaging layers on both sides of said support, each protective layer having essentially the same composition, wherein the reducing agent on both sides of said support is the same and is present in the form of stable aqueous solid particle dispersion comprising solid particles of ascorbic acid ester is L-ascorbic acid 6-O-palmitate, said solid particle dispersion further comprising a particle growth modifier that is present in an amount of at least 1 and less than 5 weight % based on the weight of said ascorbic acid ester, said particle growth modifier is D-iso-ascorbic acid 6-O-palmitate, palmitic acid, monopalmitin, or monostearin.

33. A method of forming a visible image comprising:
(A) imagewise exposing the thermally developable material of claim 16 that is a photothermographic material to form a latent image,
(B) simultaneously or sequentially, heating said exposed photothermographic material to develop said latent image into a visible image.

34. The method of claim 33 wherein said photothermographic material comprises a transparent support, and said image-forming method further comprises:
(C) positioning said exposed and photothermographic material with the visible image therein between a source of imaging radiation and an imageable material that is sensitive to said imaging radiation, and
(D) exposing said imageable material to said imaging radiation through the visible image in said exposed and photothermographic material to provide an image in said imageable material.

35. The method of claim 33 wherein said imagewise exposing is carried out using visible light or X-radiation.

36. The method of claim 33 wherein said photothermographic material is arranged in association with one or more phosphor intensifying screens during imaging.

37. The method of claim 33 comprising using said visible image in said exposed photothermographic material for medical diagnosis.

38. A method of forming a visible image comprising:
(A') imagewise exposing the photothermographic material of claim 29 to form a latent image,
(B) simultaneously or sequentially, heating said exposed photothermographic material to develop said latent image into a visible image.

39. An imaging assembly comprising the photothermographic material of claim 22 that is arranged in association with one or more phosphor intensifying screens.

40. A method of forming a black-and-white image comprising exposing the imaging assembly of claim 39 to X-radiation.

41. A method of forming a visible image in the material of claim 17 that is a thermographic material, comprising:
(A) thermal imaging of said thermographic material.

* * * * *